United States Patent
Goel et al.

(10) Patent No.: US 10,911,840 B2
(45) Date of Patent: Feb. 2, 2021

(54) METHODS AND SYSTEMS FOR GENERATING CONTEXTUAL DATA ELEMENTS FOR EFFECTIVE CONSUMPTION OF MULTIMEDIA

(71) Applicant: Streamingo Solutions Private Limited, Bangalore (IN)

(72) Inventors: Vaibhav Goel, Bangalore (IN); Sharath Manjunath, Leeming (AU); Vidhya T V, Bangalore (IN); Vinay T S, Bangalore (IN)

(73) Assignee: STREAMINGO SOLUTIONS PRIVATE LIMITED, Bangalore (IN)

(*) Notice: Subject to any disclaimer, the term of this patent is extended or adjusted under 35 U.S.C. 154(b) by 83 days.

(21) Appl. No.: 16/422,658

(22) Filed: May 24, 2019

(65) Prior Publication Data
US 2019/0294668 A1    Sep. 26, 2019

Related U.S. Application Data

(63) Continuation-in-part of application No. 15/786,077, filed on Oct. 17, 2017, now abandoned.

(30) Foreign Application Priority Data

Dec. 3, 2016    (IN) .............................. 201641041399

(51) Int. Cl.
*H04N 7/16* (2011.01)
*H04N 21/8545* (2011.01)
(Continued)

(52) U.S. Cl.
CPC ......... *H04N 21/8545* (2013.01); *G06F 16/43* (2019.01); *G06F 16/71* (2019.01);
(Continued)

(58) Field of Classification Search
CPC ....... H04N 21/8545; H04N 21/234336; H04N 21/26603; H04N 21/278; H04N 21/4532;
(Continued)

(56) References Cited

U.S. PATENT DOCUMENTS

| 8,539,359 B2* | 9/2013 | Rapaport | G06Q 30/02 715/751 |
| 9,374,411 B1* | 6/2016 | Goetz | H04L 67/125 |

(Continued)

*Primary Examiner* — Pankaj Kumar
*Assistant Examiner* — Sahar Aqil Riaz
(74) *Attorney, Agent, or Firm* — Mannava & Kang, P.C.; Vinay Malik

(57) ABSTRACT

Embodiments herein disclose methods and systems for identifying consumption intent of a user in multimedia of an electronic device. A method disclosed herein includes generating contextual data elements for content of the multimedia, wherein the contextual data elements include direct and implied information of the multimedia that enable a user to match and validate intent of consuming the content of the multimedia. The contextual data elements include a text summary, a visual summary, keywords and/or keyphrases, paragraphs, chapters, index tables, questions, analytics, emotions and insights for the content of the multimedia. Further, the method includes displaying the contextual data elements to the user. The user uses the contextual data elements to navigate within the multimedia/across multiple multimedia.

24 Claims, 13 Drawing Sheets

(51) Int. Cl.

| | |
|---|---|
| H04N 21/8405 | (2011.01) |
| H04N 21/278 | (2011.01) |
| H04N 21/45 | (2011.01) |
| H04N 21/4788 | (2011.01) |
| H04N 21/482 | (2011.01) |
| G06F 16/71 | (2019.01) |
| G06F 16/43 | (2019.01) |
| G06K 9/00 | (2006.01) |
| G10L 25/63 | (2013.01) |
| H04N 21/266 | (2011.01) |
| G06F 16/783 | (2019.01) |
| H04N 21/2343 | (2011.01) |
| G06F 16/74 | (2019.01) |
| H04N 21/81 | (2011.01) |
| G06F 40/289 | (2020.01) |
| G10L 15/26 | (2006.01) |

(52) U.S. Cl.
CPC .......... *G06F 16/745* (2019.01); *G06F 16/783* (2019.01); *G06F 40/289* (2020.01); *G06K 9/00268* (2013.01); *G06K 9/00744* (2013.01); *G10L 15/26* (2013.01); *G10L 25/63* (2013.01); *H04N 21/234336* (2013.01); *H04N 21/26603* (2013.01); *H04N 21/278* (2013.01); *H04N 21/4532* (2013.01); *H04N 21/4788* (2013.01); *H04N 21/4828* (2013.01); *H04N 21/8133* (2013.01); *H04N 21/8405* (2013.01)

(58) Field of Classification Search
CPC ........... H04N 21/4788; H04N 21/4828; H04N 21/8133; H04N 21/8405
USPC ......................................................... 725/136
See application file for complete search history.

(56) References Cited

U.S. PATENT DOCUMENTS

| | | | | |
|---|---|---|---|---|
| 10,467,335 | B2* | 11/2019 | Mertens | G10L 15/22 |
| 10,558,761 | B2* | 2/2020 | Li | G06K 9/6293 |
| 10,657,954 | B2* | 5/2020 | Mertens | G10L 15/26 |
| 2002/0083473 | A1* | 6/2002 | Agnihotri | H04N 21/431 |
| | | | | 725/140 |
| 2003/0234772 | A1* | 12/2003 | Zhang | G11B 27/34 |
| | | | | 345/177 |
| 2004/0133927 | A1* | 7/2004 | Sternberg | G06F 16/7328 |
| | | | | 725/136 |
| 2006/0212897 | A1* | 9/2006 | Li | H04N 21/6125 |
| | | | | 725/32 |
| 2007/0078715 | A1* | 4/2007 | Murakami | G06Q 30/0269 |
| | | | | 705/14.66 |
| 2010/0153885 | A1* | 6/2010 | Yates | H04N 21/4532 |
| | | | | 715/841 |
| 2010/0205541 | A1* | 8/2010 | Rapaport | G06F 16/285 |
| | | | | 715/753 |
| 2014/0040273 | A1* | 2/2014 | Cooper | G06F 16/41 |
| | | | | 707/741 |
| 2015/0309990 | A1* | 10/2015 | Allen | G06F 16/245 |
| | | | | 704/9 |
| 2016/0021249 | A1* | 1/2016 | Govande | H04M 3/4365 |
| | | | | 455/414.1 |
| 2016/0092407 | A1* | 3/2016 | Ball | H04N 1/00 |
| | | | | 715/202 |
| 2016/0358633 | A1* | 12/2016 | Poral | G11B 27/034 |
| 2017/0134819 | A9* | 5/2017 | Mohamed | H04L 67/14 |
| 2017/0161242 | A1* | 6/2017 | Clark | G06F 40/151 |
| 2017/0289619 | A1* | 10/2017 | Xu | H04N 21/251 |
| 2018/0061459 | A1* | 3/2018 | Song | H04N 21/4316 |
| 2019/0110728 | A1* | 4/2019 | Sbodio | A61B 5/165 |
| 2020/0221190 | A1* | 7/2020 | Bhattacharjee | H04N 21/4758 |

* cited by examiner

METHODS AND SYSTEMS FOR GENERATING CONTEXTUAL DATA ELEMENTS FOR EFFECTIVE CONSUMPTION OF MULTIMEDIA

CROSS REFERENCE TO RELATED APPLICATION

This application is a Continuation-in-Part (CIP) of U.S. application Ser. No. 15/786,077 filed on Oct. 17, 2017, which derives the benefit of Indian Provisional Application 201641041399 filed on Dec. 3, 2016, the contents of which are incorporated herein by reference.

TECHNICAL FIELD

The embodiments herein relate to electronic devices and, more particularly, to generating contextual data elements from comprehensive analysis of multimedia to identify consumption intent of a user while consuming the multimedia, wherein the contextual data elements include direct and implied information extracted from content of the multimedia.

BACKGROUND

Generally, multimedia such as videos are being used to share information and messages on the Internet. It is now easy to make the multimedia and capture audiences thought processes. It is possible to reach large audiences using multimedia as the medium of communication. This large proliferation has resulted in there being too many multimedia with duplicate messages on the Internet today. There is no intelligent system, which helps to choose the right media to use/view/consume and, and the one that can be understood most effectively.

There are also few unsolved problems in conventional media space, due to which the user may not able to consume the multimedia productively or effectively. The unsolved problems can be, but not limited to, selection of the multimedia which caters to user's media consumption (what is my situation), identifying intent (what I want to achieve), generation of insights (for example in case of a product survey/usage), generation of inferential data, categorization of emotions for better understanding of themes/emphasis/ speaker intent/customer satisfaction, performing a search within the multimedia and across the multimedia with cross-linked and specific common information, performing zoom in to relevant portions, locating/filtering/avoiding media satisfying certain criteria, using the multimedia itself as a tool to evaluate user' feedback and product use statistics and glean valuable information and so on.

Further, due to the user's short attention span or a lack of available productive time or a need for reduction in physical eyes and ears on the multimedia, there should be a way to help the user to quickly get a gist of important concepts described in the multimedia, along with useful analytics, summaries and inferences. However, in conventional approaches, there is no way to provide details regarding the important concepts of the multimedia, the analytics, the summaries and the inferences. Further, in the conventional approaches, there is no way to provide additional relevant content that would help the user to broaden the perspective on and analyze main topics and themes described in the multimedia.

Further, an availability of huge multimedia content, has made accessing information a stressful effort. To establish a relevant context to select and consume the multimedia is a time-consuming effort, which often leads to bubbling of unnecessary information and waste of time and effort. The user can select the multimedia for consumption by establishing the context based on a title of the multimedia or based on manual additional tags associated with the multimedia (if available.). However, the title may not always map with the context of the multimedia and the manual additional tags may be inappropriate sometimes and may not map with context of the multimedia always. Thus, in the conventional approaches, the user has to establish the context only after watching the multimedia. Further, in the conventional approaches, there may be high chances that the context can be different from what is desired by the user. Further, in the conventional approaches, there in no way to validate whether the user understood the content of the multimedia. Thus, multimedia content providers and media producers find a gap between the expected and actual viewership of their online multimedia content.

Consider an example scenario, wherein the user wants to watch a video, which is discussing about how to calculate a Net Present Value (NPV) when cash flows are uneven. In this example scenario, how to calculate Net Present Value (NPV) when cash flows are uneven acts as a viewing intent of the user and this process is called "setting the viewing intent". Furthermore, based on this viewing intent, the user may go through a process of searching videos online. The process of searching presents the user with several different videos titled with Finance and Accounting, Business Finance, Net Present Value or the like as search results. Among the search results, the user has to select the video to watch which has titles closely matching with the set viewing intent. It is likely that the user may start watching the video based on the matching title of Net Present Value. However, the user may not be sure whether the selected video does contain the relevant content, which satisfies the viewer intent. If the video does not contain the relevant content satisfying the viewer intent, the user might continue to watch the selected filtered videos (from the search results) until an exact match for the desired viewing intent is found. Thus, an entire process is time consuming and tedious.

In the conventional approaches, Learning Management Systems (LMS) may be used to help the user to select and consume the right multimedia, wherein the content of the multimedia is curated and managed reasonably well and pushed according to desires and plan of the end user (student, teacher, and so on.). However, the LMS may not provide a quick summary, useful cross-references and additional relevant information to augment the studies, as well as self and enforced assessment for assured understanding. Thus, in cases of self-directed learning, the LMS may not provide an efficient way for the user to select the right multimedia and right content/portions of the multimedia.

Further, the conventional approaches disclose methods to cater to the user's context by providing an index of the content of the multimedia and transcripts of speech spoken of the video/multimedia. However, these methods are manual, tedious and are limited to meet the scale of the online multimedia content. These methods are clearly limited because of the technical barriers posed by the expectations of such a method, which should automatically create the user's context when watching the multimedia and should meet the scale of time and be significantly less than the effort of online multimedia content creation.

BRIEF DESCRIPTION OF THE FIGURES

The embodiments disclosed herein will be better understood from the following detailed description with reference to the drawings, in which.

DETAILED DESCRIPTION OF EMBODIMENTS

Figure 1:
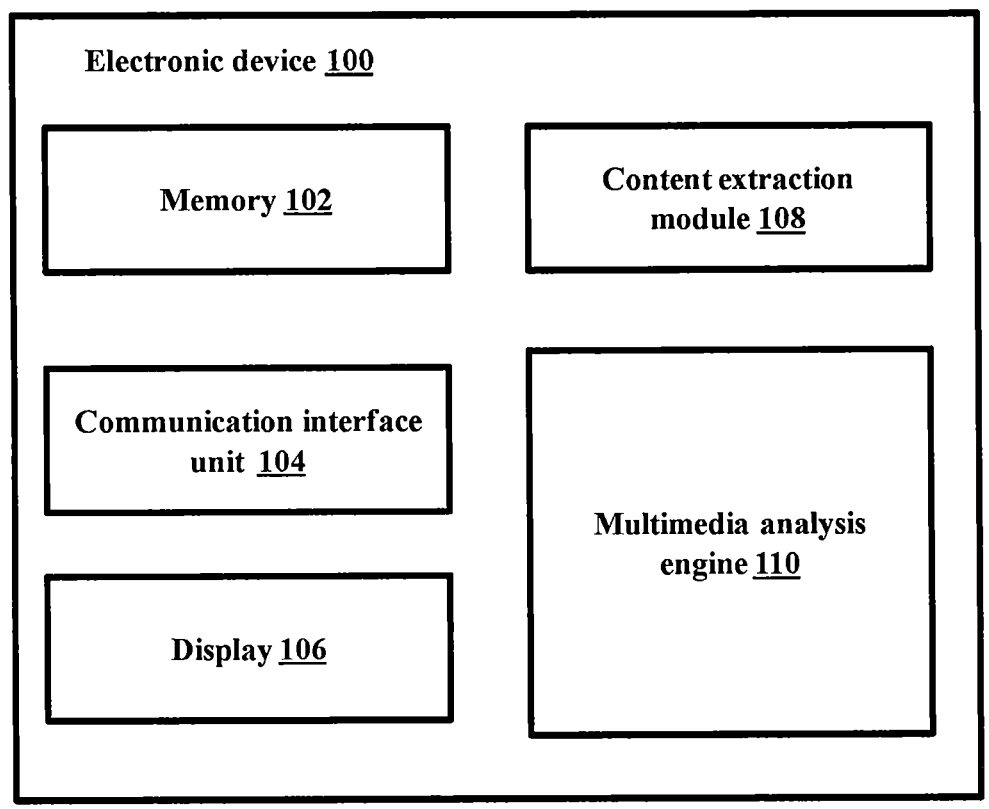
FIG. 1 depicts an electronic device, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for generating contextual data elements from a comprehensive analysis of multimedia to identify intent of a user when consuming the multimedia. The contextual data elements can provide direct and implied information of the multimedia. The contextual data elements can be at least one of textual summary, keywords and/or keyphrases, paragraphs, chapters, index tables, questions, analytics, emotions, insights and so on.

Embodiments herein disclose methods and systems for generating the summary based on analysis of content(s) of the multimedia present in a form of at least one of audio portions and video portions.

Embodiments herein disclose methods and systems for generating the keywords and/or keyphrases by analyzing the audio portions, text portions and objects and/or actions of the video portions of the multimedia. The keywords and/or keyphrases enable the user to search within the multimedia or across the multiple multimedia.

Embodiments herein disclose methods and systems for generating the paragraphs and chapters based on at least one of the keywords and/or keyphrases and the textual summary generated for the content of the multimedia. The chapters enable the user to navigate within the multimedia or across the multiple multimedia.

Embodiments herein disclose methods and systems for generating the index tables for the chapters of the multimedia based on the content of the multimedia, which are synced with occurrence of the contents on a time scale of the multimedia.

Embodiments herein disclose methods and systems for generating the questions based on the keywords and/or keyphrases generated for the content of multimedia for purpose of assessment of understanding of the content of the multimedia by the user.

Embodiments herein disclose methods and systems for generating the analytics based on the keywords and/or keyphrases generated for the multimedia, questions generated for the multimedia and answers provided by the user for the questions generated.

Embodiments herein disclose methods and systems for generating the emotions present in the multimedia for purpose of understanding the content of the multimedia.

Embodiments herein disclose methods and systems for generating insights based on the emotions and the analytics generated for the multimedia and answers generated to specific queries of interest about the content of the multimedia.

Referring now to the drawings, and more particularly to FIGS. 1 through 12, where similar reference characters denote corresponding features consistently throughout the figures, there are shown embodiments.

FIG. 1 depicts an electronic device 100, according to embodiments as disclosed herein. The electronic device 100 referred herein can be a digital device which has the capability of playing content of multimedia/media or accessing an application (such as a browser) which can access and display the multimedia. Examples of the electronic device 100 can be, but is not limited to, a mobile phone, a smartphone, tablet, a phablet, a personal digital assistant (PDA), a laptop, a computer, a wearable device, a smart watch, an IoT (Internet of Things) device, a wearable computing device, a vehicle infotainment system, a medical device, a camera, a Virtual Reality (VR) device, a vehicle display and so on. Examples of the multimedia as disclosed herein can be, but not limited to, videos, presentations, slideshows, audio, and so on. The multimedia can include at least one of images/image frames, slides, pages and so on (depending on a type) for presenting content. Further, the content of the multimedia can be presented in a form of at least one of audio portions, video portions or the like. The video portions can include at least one of text portions and objects and/or actions or the like.

The electronic device 100 can also communicate with external entities such as but not limited to, a server, a cloud, a database and so on using a communication network to access the application, from which the multimedia can be accessed and displayed to a user. Examples of the communication network can be at least one of the Internet, a wired network, a wireless network (a Wi-Fi network, a cellular network, Wi-Fi Hotspot, Bluetooth, Zigbee and so on) and so on. The user referred herein can be a person who consumes (views/listens) the multimedia. Examples of the user can be, but not limited to, learning system administrators, teachers/coaches, students, market and scientific researchers, media producers, an average movie watcher, or any person who is creating the multimedia a repository of extracted and inferred latent information. Embodiments herein use the terms such as "user", "consumer", "viewer, "listener" and so on interchangeably to refer to the person who consumes the multimedia. The electronic device 100 can also act as a server (not shown) that can provide the multimedia to be displayed on the electronic device 100/user device located in different geographical locations. The server can be at least one of a remote server, a cloud server and so on.

The electronic device 100 includes a memory 102, a communication interface unit 104, a display 106, a content extraction module 108 and a multimedia analysis engine 110.

The memory 102 can store the multimedia, content extracted from the multimedia, contextual data elements generated by the multimedia analysis engine 110 (textual summaries, keywords and/or keyphrases, chapters, indices, paragraphs, insights, emotions, questions, analytics and so on generated from contents of the multimedia) and so on. The memory 102 may include one or more computer-readable storage media. The memory 102 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 102 may, in some examples, be considered anon-transitory storage medium. The term "non-transitory" may indicate that the storage medium is not embodied in a carrier wave or a propagated signal. However, the term "non-transitory" should not be interpreted to mean that the memory 102 is non-movable. In some examples, the memory 102 can be configured to store larger amounts of information than the memory. In certain examples, a non-transitory storage medium may store data that can, over time, change (e.g., in Random Access Memory (RAM) or cache).

The communication interface unit 104 can be configured to establish communication between the electronic device 100 and the at least one external entity, using the communication network.

The display 106 can be configured to display the multimedia (stored in the memory 102 or obtained from accessing the application) to the user. The display 106 can also be configured for displaying the contextual data elements generated by the multimedia analysis engine 110 to the user. The display 106 can also configured for enabling the user to interact with the electronic device 100 by receiving inputs from the user.

The content extraction module 108 and the multimedia analysis engine 110 can include at least one of a single processor, a plurality of processors, multiple homogenous cores, multiple heterogeneous cores, multiple Central Processing Unit (CPUs) of different kinds and so on. The content extraction module 108 can be configured to extract the content(s) (the video portions, the audio portions, metadata associated with the multimedia or the like) from the multimedia. The content extraction module 108 can receive the multimedia from the memory 102. Also, the content extraction module 108 can perform crawling to obtain the multimedia from an online repository (by accessing the application through the browser). The content extraction module 108 applies a data extraction process on the received multimedia to extract the content from the multimedia and convert the extracted content into appropriate forms (single channel format, bandwidth format and so on). Once the content is extracted, the content extraction module 108 applies a noise elimination process on the extracted content to filter out irrelevant content, which is not required for processing. After filtering the irrelevant content, the content extraction module 108 classifies the content into different categories/domains that can be associated with the multimedia.

The multimedia analysis engine 110 can be configured to analyze the extracted content of the multimedia to generate the contextual data elements for identifying intent of the user when consuming the multimedia and for navigating within and across the multimedia. The contextual data elements can include direct and implied information extracted from the content of the multimedia. The contextual data elements can be information entities representing the context of the multimedia and enable the user to match and validate intent of consuming the content of the multimedia. The contextual data elements generated by the multimedia analysis engine 110 can be, but not limited to, keywords and/or keyphrases, summary/summaries, paragraphs, chapters, index tables, questions, analytics, insights, emotions and so on. The multimedia analysis engine 110 provides the generated contextual data elements to the display 106 to display the contextual data elements to the user while consuming the corresponding multimedia. The user can use the contextual data elements for better understanding, navigation and evaluation of the multimedia, thus consuming the multimedia effectively.

The multimedia analysis engine 110 can be further configured to receive an input (wherein the input can comprise of at least one keyword and/or keyphrase) to play the multimedia associated with the received at least one keyword and/or keyphrase using the display 106. The multimedia analysis engine 110 can also be configured to play an interested portion of the multimedia on receiving an input from the user on the generated index table/table of contents. The multimedia analysis engine 110 can also be configured to receive a user search intent as an input from the user and identify and display the content of the multimedia that matches with the user search intent as search results. The multimedia analysis engine 110 can identify the content of the multimedia that matches with the user search intent using the at least one contextual data element. The user search intent can be at least one of a keyword, keyphrase, sentence or the like. The user search intent can be at least one of an audio input, video/image input, textual input and so on.

FIG. 1 shows exemplary units of the electronic device 100, but it is to be understood that other embodiments are not limited thereon. In other embodiments, the electronic device 100 may include lesser or more number of units. Further, the labels or names of the units are used only for illustrative purpose and does not limit the scope of the embodiments herein. One or more units can be combined together to perform same or substantially similar function in the electronic device 100.

Figure 2:
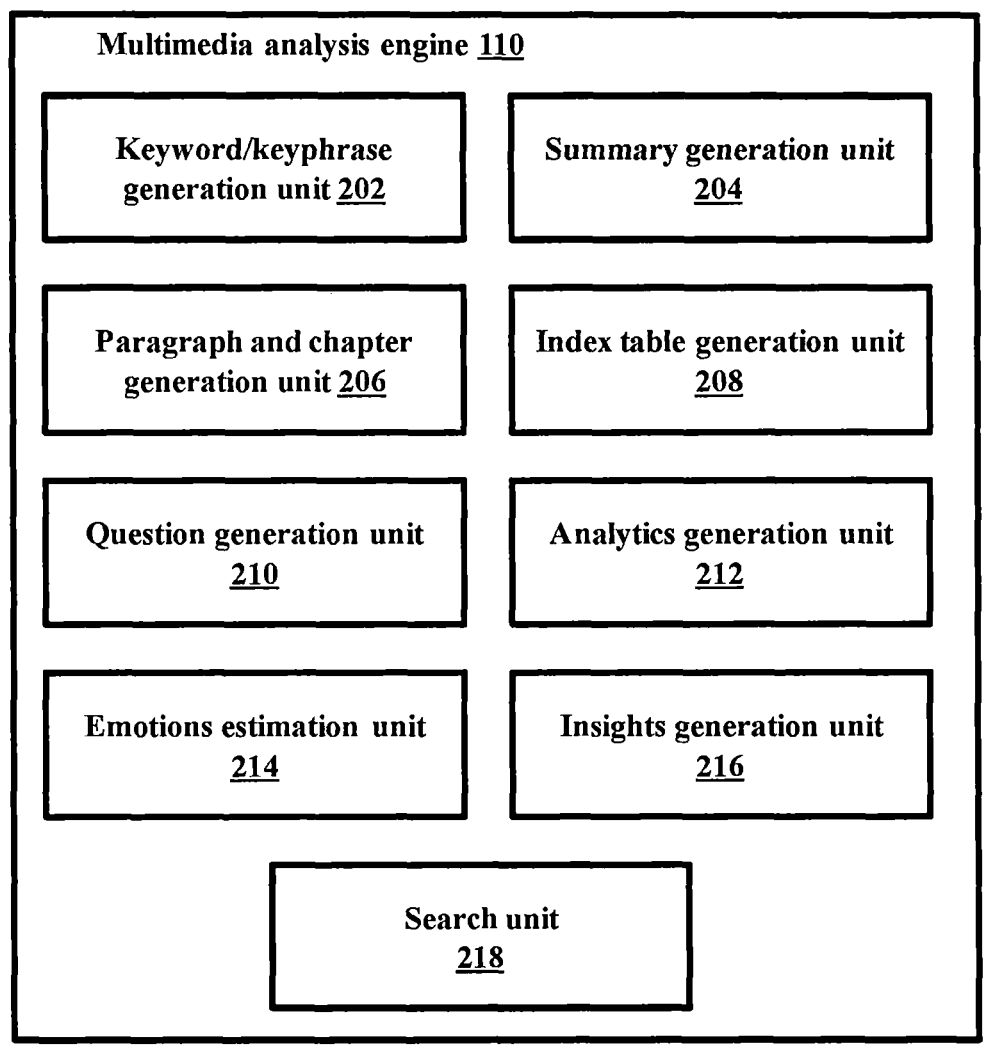
FIG. 2 is an example diagram illustrating various units of a multimedia analysis engine for analyzing the multimedia and extracting contextual data elements for identifying intent of a user, according to embodiments as disclosed herein.

FIG. 2 is an example diagram illustrating various units of the multimedia analysis engine 110 for analyzing the multimedia and extracting the contextual data elements for identifying the intent of the user, according to embodiments as disclosed herein. The multimedia analysis engine 110 includes keyword/keyphrase generation unit 202, a summary generation unit 204, a paragraph and chapter generation unit 206, an index table generation unit 208, a question generation unit 210, an analytics generation unit 212, an emotion estimation unit 214, an insights generation unit 216 and a search unit 218.

The keyword/keyphrase generation unit 202 can be configured to generate the keywords and/or keyphrases by analyzing the contents of the multimedia. The keyword/keyphrase generation unit 202 extracts the audio portions from the multimedia using an automatic speech recognition (ASR) method. The keyword/keyphrase generation unit 202 uses a matrix of machine learned contextual data models to convert the audio portions into a transcript/textual summary. The textual summary can be structured text or unstructured text and with or without errors. The matrix of the machine learned contextual models represents an arrangement of different types of machine learnt data models carrying the context of the multimedia, which can be used by different methods in their independent capacities to produce outputs in a form of new data. Further, the keyword/keyphrase generation unit 202 performs a post processing of the transcript for filtering errors and other corrections to obtain structured text using the at least one machine learnt model. The structured text can be a punctuated, ordered text without any errors. The keyword/keyphrase generation unit 202 further processes the structured text automatically to generate the keywords and/or the keyphrases that represent context of the content of the multimedia presented in a form of the audio portions.

The keyword/keyphrase generation unit 202 can be further configured to use an Optical Character Recognition (OCR) method to identify text portions from the extracted video portions (including image frames) of the multimedia. The keyword/keyphrase generation unit 202 processes the identified text portions to generate the keywords and/or keyphrases that represent context of the content presented in a form of the text/visual content (of the image frames). The keyword/keyphrase generation unit 202 can be further configured to use Computer Vision (CV) techniques to identify objects and/or actions (human-object-interaction or events (other than the text portions)) included in the image frames of the extracted video portions. The keyword/keyphrase generation unit 202 processes the detected objects and/or actions and converts the detected objects and/or actions into a textual list, which in turn further processed to generate the keywords and/or keyphrases that represent context of the content presented in a form of the visual content. The keyword/keyphrase generation unit 202 combines the keywords and/or keyphrases generated from the extracted audio portions and the video portions to generate a set of keywords and/or the keyphrases for the contents of the multimedia. In an embodiment, the keyword/keyphrase generation unit 202 analyzes at least one source of the multimedia to obtain at least one text, wherein the at least one source includes the audio portions and the visual portions. The keyword/keyphrase generation unit 202 extracts the keywords from the extracted at least one text. The keyword/keyphrase generation unit 202 generates the keyphrases for the extracted keywords. The keyword/keyphrase generation unit 202 further merges the keywords and the keyphrases to generate a plurality of elements from the multimedia, wherein the plurality of elements includes the context dependent set of keywords and/or keyphrases.

The summary generation unit 204 can be configured for generating the summary for the contents of the multimedia. The summary can include at least one of a text summary and a video/visual summary. The summary generation unit 204 can process the structured text generated associated with the textual summary (generated by the keyword/keyphrase generation unit 202) using at least one of an extractive technique and an abstractive technique to generate the text summary. The summary generation unit 204 further uses the video frames of the video portions (visual/image/frame data, textual data or graphical textual data) and aligns the video frames with the text summary to generate the video summary. The generated video summary can be the summary including the video frames with or without accompanying the audio. The video summary can also be generated in response to a specific query or from preset queries one of which could be based on importance of certain keywords or objects and actions.

In an embodiment, the summary generation unit 204 can use a combination of an image processing technique, a speech recognition technique, a natural language processing (NLP) technique, machine learning and neural networks and so on to process the audio portions, the text frames of the video and the objects and/or actions of the multimedia and generate the summary for the contents of the multimedia. The summary generation unit 204 can further extract the keywords and/or keyphrases and a table of contents from the summary using at least one of neural networks, a domain classification method or the like. The summary generated from the multimedia can serve as a trailer for the multimedia and also optionally tailored to specific queries on the keywords and/or keyphrases.

The paragraph and chapter generation unit 206 can be configured to generate one or more chapters from the summary generated for the multimedia.

The paragraph and chapter generation unit 206 analyzes the at least one of the keywords and/or keyphrases appeared at a timestamp associated with the summary, the structured text (punctuated transcript), OCR markings associated with the keywords and/or keyphrases and so on using the at least one machine learnt model of the matrix of the machine learned contextual models and the NLP method to generate the paragraphs. In an embodiment, the paragraph and chapter generation unit 206 further analyzes sentences present in the paragraphs to determine subject associated with the paragraphs, a change in the subject, a start of new subject and so on using the matrix of the machine learned contextual models. In an embodiment, the paragraph and chapter generation unit 206 may combine the paragraphs and analyze the sentences to determine the subject associated with the combined paragraphs, the change in the subject, the start of new subject and so on using the matrix of the machine learned contextual models. Based on the determined subject, the change in subject and the start of new subject, the paragraph and chapter generation unit 206 generates the chapters. For example, the paragraph may itself represent the chapter or the sentence(s) of the paragraph may represent the chapter or a combination of one or more sentences of the paragraphs may represent the chapter. The chapters can provide a quick zoomed out glance, a zoom-in, a focused view of the contents of the multimedia. Thus, the user can use the chapters' information to navigate within the multimedia.

The index table generation unit 208 can be configured to generate one or more index tables for the generated one or more chapters, so that the user can be enabled to search inside the multimedia. The index table generation unit 208 can also create titles of the paragraphs of the chapters and estimate duration of the chapters or the paragraphs of the chapters. The index table generation unit 208 can generate the index table automatically using the contents of the multimedia, which are synced with occurrence of the contents on a time scale of the multimedia. In an embodiment, the index table generation unit 208 can convert the textual summary/transcript into the structured ordered text using at least one machine learned data model of the matrix of machine learned contextual data models. Examples of the data model can be, but is not limited to, a speech acoustic model, a domain language model, a domain centric model, a lexicon and so on. The structured ordered text represents a clean, punctuated data, that can be paraphrased using the at least one data model (for example; the domain centric model). The index table generation unit 208 further identifies new contextual titles and subtitles from the structured text using the at least one data model. Based on the contextual titles and the subtitles, the index table generation unit 208 generates the index tables for the chapters of the multimedia.

The question generation unit 210 can be configured to generate one or more questions for the contents of the multimedia (as disclosed in Indian Patent Application 201842001026). The questions can be generated for a purpose of understanding the contents of the multimedia, for a purpose of assessment of understanding of the contents of the multimedia and for a purpose of generating analytics and insights about the contents of the multimedia. The question generation unit 210 generates the questions based on at least one of the keywords and/or keyphrases generated by the keyword/keyphrase generation unit 202 and the summary generated by the summary generation unit 204. The keywords and/or keyphrases and the summary can be generated based on the transcript generated from the audio portions using the ASR method, the text portions generated from the image frames (the video portions) using the OCR method, the objects and/or actions generated from the image frames using the CV techniques and so on. The question generation unit 210 can generate the questions in at least one category. Examples of the category can be, but is not limited to, an objective category (provided with either multiple choices for answers to be selected from or no choices), a subjective category (descriptive answers), a factual category, a general knowledge category, a pre-determined category (questions from the pre-determined category/canned data set) and so on. The question generation unit 210 can further configured to (incorporate a method) correct the questions and rank the questions in terms of parameters such as, but not limited to, accuracy, relevance, priority, difficulty and so on. The question generation unit 210 analyzes and parses the transcript/OCR text associated with the question to understand semantic information. The semantic information can be leveraged to formulate sentence(s). The question generation unit 210 further ranks the sentences (associated with the questions) based on at least one parameter. Examples of the parameter can be, but not limited to, how important is the sentence, what entities are present in the sentence, how likely the sentence to be tagged as a good sentence and so on.

The question generation unit 210 can be configured to instruct the display 106 to display the questions based on factors such as, but not limited to, the ranks assigned for the questions, types of the questions planned/intended from a Learning Management System (LMS) provider, timestamps of the keywords and/or keyphrases, timestamps of the video frames, timestamps of the transcript (from speech or graphical text), and so on. The question generation unit 210 can be configured to instruct the display 106 to display the questions (as disclosed in U.S. patent application Ser. No. 16/115,431) at fixed timestamps during the playback of the multimedia content, and/or at random timestamps during the playback of the multimedia, and/or at the end of the playback of the multimedia. The question generation unit 210 can be further configured to adjust display of the questions when the multimedia is replayed and based on correctness of the answers provided by the user in response to the displayed questions. The question generation unit 210 can dynamically adjust the display of the questions by at least one of adjusting time location, adjusting selection of the questions, adjusting repetition of the questions, adjusting skipping of the questions, adjusting changing of the questions and so on every time, when the portion of the multimedia is replayed.

The analytics generation unit 212 can be configured (incorporate a method) to generate the analytics for the contents of the multimedia. The analytics are a collection, collation and orderly representation of all detected and recognized and processed data from the audio portions (speech/non-speech portions) and the video portions (the image frames, the text portions and/or the objects/actions of the images) of the multimedia. The analytics answer any direct inquiry about the factual data in the multimedia (the inquiry originating explicitly as a query or as a general matter of interest to the user/consumer).

The analytics generation unit 212 can generate the analytics based on at least one of, but not limited to, the keywords and/or keyphrases, the timestamps of the occurrences of the keywords and/or keyphrases, the objects and/or the actions recognized using the CV techniques (by the keyword/keyphrase generation unit 202), a frequency of occurrences of at least one of the keywords/and or keyphrases and the objects and/or actions, the questions generated (by the question generation unit 210) based on analysis of the textual summary, answers provided by the user in response to the displayed questions and so on. The analytics generation unit 212 generates at least one representation type for the analytics using at least one suitable method/technique. The representation type can be in a form of pictorial type. Examples of the pictorial type can be, but not limited to, graphs, charts, maps and so on. The analytics generation unit 212 instructs the display 106 to display the at least one representation type of the analytics to the user. Also, the displayed analytics can be in at least one of a standalone form, a superimposed form (superimposed on the speech portions/the video portions/the text portions/the image portions of the multimedia or along a timeline), an overlaid form (overlaid on the speech portions/the video portions/the text portions/the image portions of the multimedia or along the timeline), an interspersed form (interspersed on the speech portions/the video portions/the text portions/the image portions of the multimedia or along the timeline) and so on.

The emotions estimation unit 214 can be configured to evaluate, extract and map the emotions present in the content of the multimedia. The emotions can be estimated for a purpose of understanding the emotion of a person with the objects and/or actions and/or events and/or other persons present in the content of the multimedia. The emotions estimation unit 214 can analyze the audio portions and the video portions of the multimedia using the at least one of the matrix of the machine learned contextual models and a trained NLP model to estimate the emotions. Thus, the emotions can be derived from sources such as, but not limited to, speech portions, face, human-object interactions, music, sound, text and so on. Further, the emotions can be estimated as standalone or by combining the emotions associated with the audio portions and the video portions.

For example, the emotions can be estimated for a purpose of understanding the emotion of a person when talking about a product, or when in a conversation or interaction with another person or object, or when addressing topics and matters in a discussion or oration, or in reaction to events/actions/objects/persons or the like. The emotion estimation unit 214 can to estimate/recognize the emotions and emotion classes based on at least one of an object detection technique, a face detection method, a facial feature extraction and analysis method, a speech recognition and text analysis method, a keyword/keyphrase analysis method, a speech tone analysis method, a background audio score analysis method and so on. The emotion estimation unit 214 extracts the speech portions and non-speech portions from the audio portions of the multimedia. The emotion estimation unit 214 analyzes the speech portions using at least one of the speech recognition and text analysis method, the keyword/keyphrase analysis method and the speech tone analysis method to estimate audio input data and the associated emotions. For example, the audio input data and its associated emotions estimated from the speech portions and the non-speech portions can be, but is not limited to, a piece of music and its representation emotion, a piece of sound like laughter and its representative emotions (happiness/humor), a piece of sound's intensity and its representative emotion and so on. The emotion estimation unit 214 analyzes the video portions of the multimedia using at least one of the face feature extraction and analysis method and the face detection method and estimates video input data and the associated emotions. For example, the video input data and the associated emotions can be, but is not limited to, a particular facial expression with its extracted features and its representative emotion (happy, sad or the like). The emotion estimation unit 214 analyzes and combines the audio input data and the associated emotions and the video input data and the associated emotions to generate and classify the emotions into at least one type. The emotions can be generated and classified using either the at least one machine learnt model of the matrix of the machine learned contextual models based on at least one of a decision criteria, or a simple AND/OR combination and so on.

The insights generation unit 216 can be configured to generate the insights for the multimedia. The insights can be derivative and inferential extractions from the analytics. The insights generation unit 216 generates the insights based on at least one of analysis of the analytical data, the answers generated to specific queries of interest about the content of the multimedia, actions/and or events present in the content of the multimedia, reactions and interactions (the emotions) present in the content of the multimedia and so on. In an embodiment, the insights generation unit 216 uses text and graph parsing and interpreting and sentence-constructing algorithms to analyze the analytics by creating summaries of the analytics, interpret the graphed data based on the analytics, analyze the answers generated to specific queries of interest about the content of the multimedia, analyze the actions/and or events present in the content of the multimedia, analyze reactions and interactions present in the content of the multimedia and so on and accordingly generates the insights based on the analysis. The insights generation unit 216 may indicate textual phrasing of the analytics by finding cross-correlation across multiple events within the multimedia and across multiple multimedia using simple or complex relationships and accordingly generates the insights. For example, the analytics may show how often dishes being washed and when and by whom and also show how often mopping is being done and what is being mopped and when and by whom. For such analytics, the insights generation unit 216 may generate the insight (using the data relationship) that "more often or invariably mopping succeeds washing of the dishes".

In an embodiment, the insights generation unit 216 interprets a list of detected emotions (by the emotion estimation unit 214) and provides inferences. For example, the insights generation unit 216 provides the inferences about at least one of perceptions and emphases of a speaker, underlying themes in the contents of the multimedia, perceptions of satisfaction or dissatisfactions of products, interpersonal/human-object interactions and so on. The insights generation unit 216 performs conversion of at least one of the emotions map/layout of emotions inside the multimedia and across the multiple multimedia, a prior knowledge of the emotional content of the multimedia (whether used in the matrix of the matrix of the machine learned contextual models with training or directly) and relative frequency of every emotion occurring in the multimedia and across the multiple multimedia into the insights. The insights can indicate at least one of these features such as but not limited to, an overall or pre-dominant emotion, a certain probability of a particular emotion following another particular emotion or series of emotions, a certain probability of a resulting action or conclusion based on a mixture of emotions present and a probability of genre of the multimedia based on the mixture of emotions present in the multimedia and across the multiple multimedia.

The search unit 218 can be configured to provide search results for the user on receiving the user search intent as the input/query from the user. On receiving the user search intent, the search unit 218 determines the video frames of the multimedia matching with the user search intent using the at least one contextual data element. The search unit 218 further determines relevant content of the multimedia and sections of the content of the multimedia matching with the user search intent using the at least one contextual data element. The search unit 218 can provide at least one of the determined video frames, the relevant content and the relevant section as the search results for the user.

FIG. 2 shows exemplary units of the multimedia analysis engine 110, but it is to be understood that other embodiments are not limited thereon. In other embodiments, the multimedia analysis engine 110 may include lesser or more number of units. Further, the labels or names of the units are used only for illustrative purpose and does not limit the scope of the embodiments herein. One or more units can be combined together to perform same or substantially similar function in the multimedia analysis engine 110.

Figure 3:
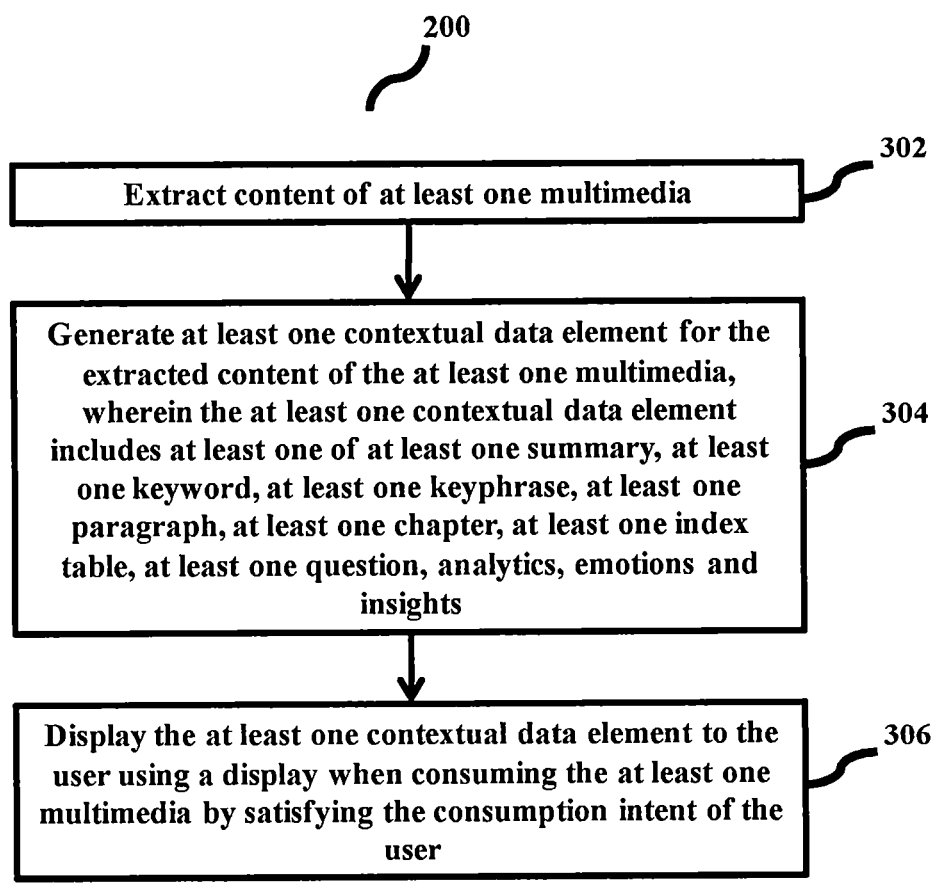
FIG. 3 is a flow diagram illustrating a method for identifying intent of the user while consuming the multimedia on the electronic device, according to embodiments as disclosed herein.

FIG. 3 is a flow diagram 300 illustrating a method for identifying the intent of the user while consuming the multimedia on the electronic device 100, according to embodiments as disclosed herein.

At step 302, the method includes extracting, by the content extraction module 108, the content of the multimedia. The extracted content can include the video portions and audio portions of the multimedia.

At step 304, the method includes generating, by the multimedia analysis engine 110, the contextual data elements for the extracted content of the multimedia. The contextual data elements include the summary, the keywords and/or keyphrases, the paragraphs, the chapters, the index tables, the questions, the analytics, the emotions, the insights and so on. The multimedia analysis engine 110 generates the keywords and/or keyphrases from the audio portions and/or the video portions of the multimedia using at least one of the ASR method, the OCR method and the CV techniques. The keywords and/or keyphrases represent the context of the multimedia. The multimedia analysis engine 110 generates the summary (the text summary and the visual summary) by analyzing the audio portions and/or the video portions of the multimedia. The multimedia analysis engine 110 generates the paragraphs from the generated summary and uses the generated paragraphs to generate the chapters for the content of the multimedia. The multimedia analysis engine 110 generates the index tables from the content of the multimedia that is synced with occurrence of the content on a time scale of the multimedia. The multimedia analysis engine 110 generates the questions based on the keywords and/or keyphrases and the summary. The multimedia analysis engine 110 generates the analytics based on the keywords and/or keyphrases, the summary, the questions, the answers provided by the user to the questions and so on. The multimedia analysis engine 110 generates the emotions based on at least one of an object detection technique, a face detection method, a facial feature extraction and analysis method, a speech recognition and text analysis method, a keyword/keyphrase analysis method, a speech tone analysis method and a background audio score analysis method. The multimedia analysis engine 108 generates the insights based on the generated analytics and the emotions.

At step 306, the method includes displaying, by the display 106, the at least one contextual data elements to the user when consuming the at least one multimedia by satisfying the consumption intent of the user.

The various actions, acts, blocks, steps, or the like in the method and the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
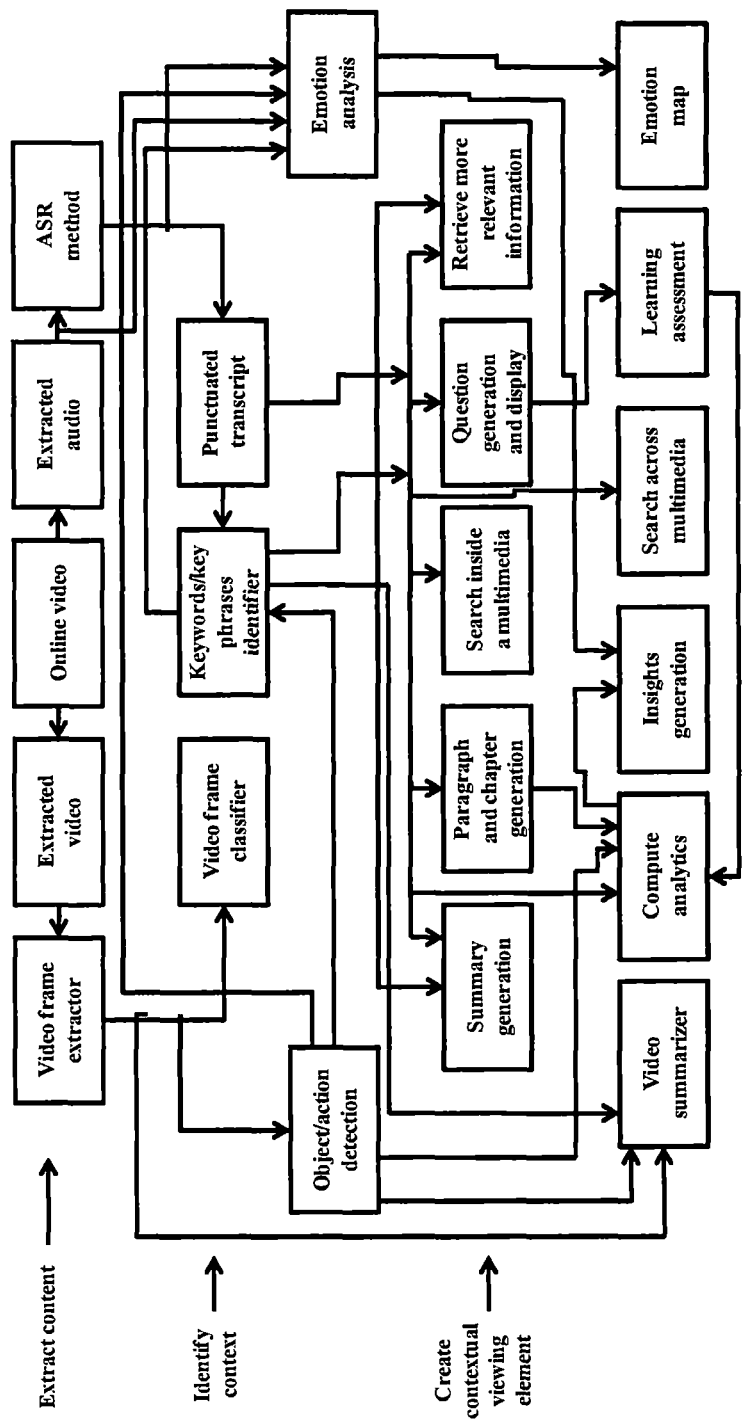
FIG. 4 is an example diagram illustrating generation of the contextual data elements from the contents of the multimedia for identifying the intent of the user, according to embodiments as disclosed herein.

FIG. 4 is an example diagram illustrating generation of the contextual data elements from the contents of the multimedia for identifying the intent of the user, according to embodiments as disclosed herein.

Embodiments herein enable the content extraction module 108 to extract the audio portions (the speech content) and the video portions (the visual content/image frames) from the multimedia. The content extraction module 108 classifies extracted audio portions and the video portions. On extracting the audio portions and the video portions (the content), the multimedia analysis engine 110 analyzes the extracted audio portions using the ASR method and converts the audio portions into the transcript/textual summary. Further, the multimedia analysis engine 110 performs a necessary and pertinent post processing on the extracted transcript for cleaning up of errors and other corrections to obtain the transcript that is automatically punctuated. The multimedia analysis engine 110 processes the punctuated transcript for identifying the keywords and/or keyphrases that represent the context of the contents presented in the audio portions of the multimedia. The multimedia analysis engine 110 analyzes the image frames of the video portions and detects the objects and/or actions using the CV technique for object detection/recognition (OD/R), action detection/recognition (AD/R), optical character recognition (OCR) and coverts the detected objects and/or actions into a textual list, which in turn processed for identifying the keywords and/or keyphrases that represent the context of the contents presented in the image frames of the multimedia. The multimedia analysis engine 110 combines the keywords and/or keyphrases obtained from the audio portions, the text portions and the objects and/or actions and forms the list of keywords and/or keyphrases. The multimedia analysis engine 110 can also estimate the emotions associated with the objects and/or actions and converts the detected emotions into the keywords and/or keyphrases and combines the keywords and/or keyphrases (from the emotions) with the combined list of keywords and/or keyphrases.

Embodiments herein enable the multimedia analysis engine 110 to further display at least one of the classified image frames, the identified keywords and/or keyphrases, the textual summary, the detected objects and/or actions, the detected emotions and so on to the user while consuming the multimedia using the display 106. Thus, the user can perform an efficient search within the multimedia.

Embodiments herein enable the multimedia analysis engine 110 to generate the questions and to display the questions to the user through the display 106 based on at least one of the classified image frames, the identified keywords and/or keyphrases, the textual summary, the detected objects and/or actions, the detected emotions and so on; thus, validating whether the user has understood the content of the multimedia.

Embodiments herein enable the multimedia analysis engine 110 to generate the paragraphs and the chapters based on at least one of the classified image frames, the identified keywords and/or keyphrases, the textual summary, the detected objects and/or actions, the detected emotions and so on. The user can use the information about the paragraphs and the chapters to navigate within the multimedia, which provides a quick zoomed out glance, a zoom-in, a focused view of the original multimedia content to the user.

Embodiments herein enable the multimedia analysis engine 110 to generate the visual summary based on at least one of the classified image frames, the identified keywords and/or keyphrases, the textual summary/the transcript, the detected objects and/or actions, the detected emotions and so on. The visual summary can act as a trailer for the multimedia and also optionally tailored to specific queries on the keywords or keyphrases.

Embodiments herein enable the multimedia analysis engine 110 to generate the analytics based on at least one of the classified image frames, the identified keywords and/or keyphrases, the textual summary, the detected objects and/or actions, the detected emotions, the generated paragraphs, the chapters, the answers provided by the user in response to the generated questions (results of learning assessments) and so on. The analytics can provide a more comprehensive view of all the information that's directly transpired/transpiring in the multimedia or indirectly implied and inferred or being implied and inferred in the multimedia.

Embodiments herein enable the multimedia analysis engine 110 to map the overall set of emotions and to establish themes with linkages to the objects and/or actions based on results of the emotions analysis, estimation and detection, which comprise an alternate overview of the multimedia content.

Embodiments herein enable the multimedia analysis engine 110 to use the estimated emotions for generating the insights, which comprise a fully comprehensive reporting and/or conclusions reporting of all the information that's directly transpired/transpiring in the multimedia or indirectly implied and inferred or being implied and inferred in the multimedia, depending on the requested query or stored/presented independent of any query.

In embodiments herein, the identified keywords and/or keyphrases, the summary (the text summary and the visual summary), the detected objects and/or actions, the detected emotions, the paragraphs, the chapters, the analytics, the questions, the insights and so on are referred as contextual data elements. The contextual data elements assist the user in identifying the consuming intent beyond the title of the multimedia. The contextual data elements are further explained in detail below:

Visual summary/video summary: The visual summary can be an automatic summarization of the content of the multimedia that is represented in the form of audio portions, the visual portions and so on. The visual summary can represent the most relevant content of the multimedia in a condensed form. The visual summary may be quick to read and view, so that the user can obtain the accurate information what has been spoken or visualized inside the multimedia. The user can also use the visual summary to validate the intent of consuming the multimedia. For example, if there is a match between the contents of the multimedia and the intent of the user, then the user can continue to consume the multimedia. Otherwise, the user can select other multimedia to consume. Thus, the visual summary allows the user to spend less time on searching and selecting the right multimedia. The visual summary can be composed of video frames that are selected and time aligned with the text summary (obtained from the structured text) based on the occurrences of sentences and the keywords and/or keyphrases in the textual summary and presented with or without accompanying the audio portions. The visual summary can be also be entirely composed of video frames (except in a case of audio-only content), rather than aligned with the text summary (obtained from the structured text). Such visual summary can use multiple sources of gleaned data (and not just the text summary). The visual summary can also provide a quick overview and a "trailer" of sorts for the user to absorb and quickly decide to move on and consume the entire video/multimedia.

Keywords and/or keyphrases: The keywords and/or keyphrases can be used for automating a process of creation of right descriptions and attributes. Also, the keywords and/or keyphrases help to classify the context of the information being searched for accurately. The user can use the keywords and/or keyphrases to match between the intent of consuming and the content of the multimedia. The keywords and/or keyphrases can be extracted using a combination of NLP techniques, machine learning and neural network techniques, that further establishes the context of the multimedia. The keywords and/or keyphrases improves search ability of the multimedia, since the keywords and/or keyphrases provides an accurate representation of the context of the multimedia.

Index table/table of contents: The index tables can help the user to navigate through the multimedia in a structured manner. The index tables can be automatically generated using the contents of the multimedia that are synced with the occurrence of the contents on the time scale of the multimedia.

Questions: The questions comprising the overall information of the multimedia can be incorporated as a system of learning assessment in the context of the original multimedia content.

Analytics: The analytics can be presented in at least one of a graphical form and a statistical form. The analytics can provide for a comprehensive and detailed related/relevant and contextual overview of all implied, inferred and direct information in the multimedia.

Emotions: The emotions can be estimated based on the objects and/or actions detected in the contents of the multimedia that are represented in the form of the speech portions and the video portions.

Insights: The insights can be generated based on the analytics and the emotions. The insights provide a fully comprehensive textual or visual report and/or valuable conclusions of all information present directly or otherwise in the multimedia. The report and/or the conclusions can be generated as a general but detailed overview or in response to a specific query received from the user.

Further, the above described contextual data elements can be used for at least one of performing the search inside the multimedia, performing the search across the multiple multimedia, retrieving other/additional relevant information from the multimedia and so on.

Performing the search inside the multimedia: The user can use the contextual data elements to search inside the multimedia and find a more relevant match satisfying the user's intent of consuming the multimedia. For example, the user can use the contextual data elements to find out few things in the multimedia such as, but not limited to, what is inside the multimedia, where in the multimedia the content related to the user's intent occur, was a specific word spoken and when, does the content of the multimedia have a certain item/concept and so on.

Performing the search across the multiple multimedia: The user can use the contextual data elements to not only search inside the multimedia but also across a repository of the multimedia, which can be processed to provide a relevant match to the user by satisfying the user's intent of consuming the multimedia. For example, the user can use the contextual data elements to perform the search across the multiple multimedia in order to find out few things in the multimedia, such as, but not limited to, which multimedia/video or videos have a certain piece of information, listing all content with angry speech and so on.

Retrieving other/additional relevant information from the multimedia: The usage of the contextual data elements by the user for retrieving the other relevant information from the multimedia enhances effectiveness of information gathering for the user by seamlessly enabling an access to the other relevant information of the multimedia. The multimedia analysis engine 110 can assemble the other relevant information using a combination of the NLP and machine learning techniques. The multimedia analysis engine 110 applies the at least one technique (the NLP and machine learning techniques) on a combination of inputs, which are in the context of the multimedia and analysis of recently captured online behavior traits of the user and assembles the other relevant information. The other relevant information can be presented in a form of at least one of relevant text, audio sources, video sources and so on. Providing the other relevant information of the multimedia to the user helps the intent of the user to look for related information and learn more thereby broadening a task of information gathering.

Figure 5:
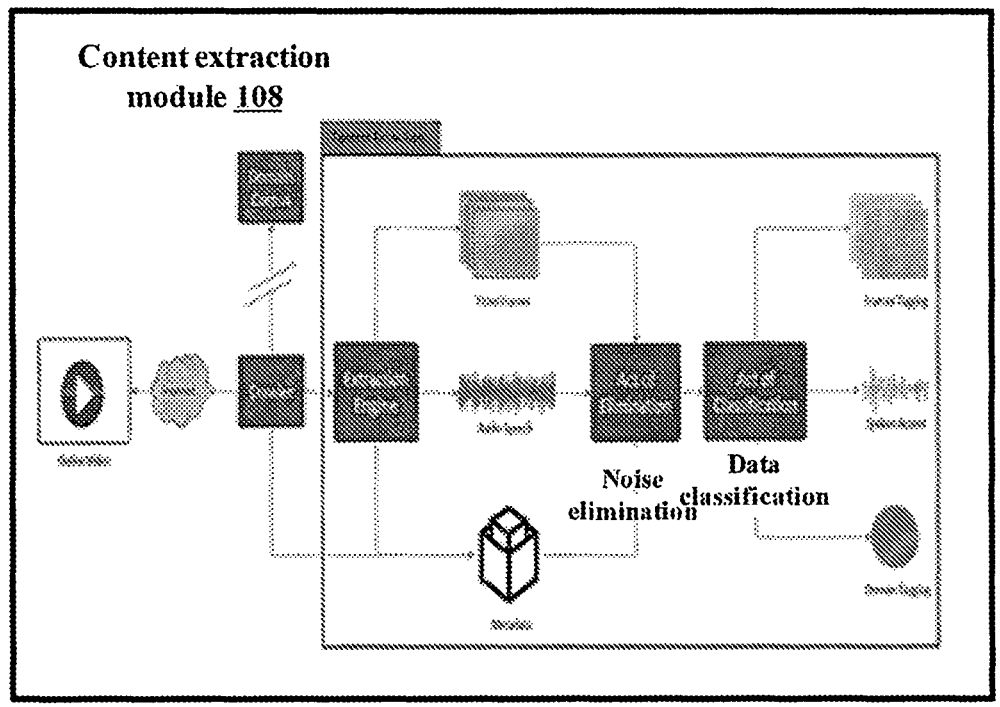
FIG. 5 is an example diagram illustrating an extraction of the content from the multimedia, according to embodiments as disclosed herein.

FIG. 5 is an example diagram illustrating an extraction of the content from the multimedia, according to embodiments as disclosed herein. The extraction of the content helps in detailed processing/analyzing of the multimedia. The extraction of the content can be useful to obtain supplementary related information from the multimedia and useful to assist in building databases for training machine learning systems and generate models with high confidence and degree of accuracy in detection, recognition, analysis and so on.

Embodiments herein enable the content extraction module 108 to extract the content from the multimedia by crawling the online multimedia repository/online repository (in cases the multimedia content is not provided or obtained by other means) and related information to select the multimedia. A result of the crawling can include a multi-domain data corpus. The data corpus includes documents, metadata, tagged audio and video content classified into different domains/categories.

Once the online multimedia is selected, the multimedia analysis engine 110 performs the data extraction process, the noise elimination process and the data classification process to extract the content from the selected multimedia. The data extraction process involves extracting the content from the selected multimedia and converting the extracted content into appropriate formats. The extracted content includes video frames, audio streams, video metadata or the like. For example, the audio speech data can be extracted from the selected online multimedia and the audio speech data can be converted into at least one of a single channel, 16 bits and 16 kHz bandwidth format.

The noise elimination process involves filtering out irrelevant content/data (which cannot be utilized for further processing) from the content extracted and converted into the appropriate format. For example, the audio speech data identified with multiple high and low frequencies compressed at very low bit rates can be filtered out.

The data classification process involves classifying the filtered content into different categories. The categories can be tagged with the multimedia that generate a useful context for the multimedia during further data processing. For example, the extracted video frames can be classified into different categories based on at least one of images, changes in scenes and identification of text and so on. Further, the audio stream associated with the video frames can be classified into the different categories based on at least one of spoken accent, dialects, gender and so on. Also, metadata associated with the video frames can be categorized.

Figure 6:
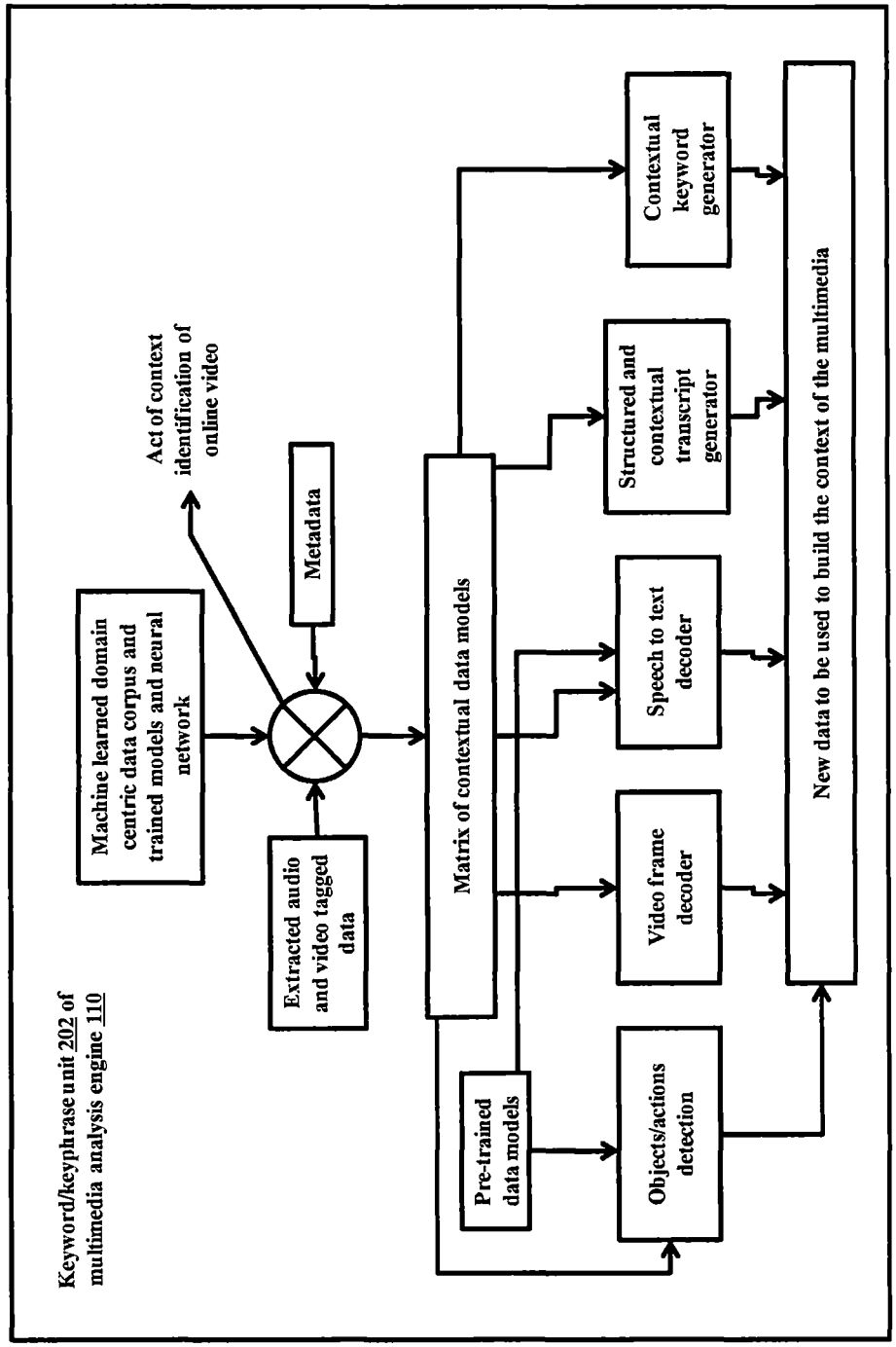
FIG. 6 is an example block diagram illustrating context establishment for the multimedia by generating the keywords and/or keyphrases, according to embodiments as disclosed herein.

FIG. 6 is an example block diagram illustrating context establishment for the multimedia by generating the keywords and/or keyphrases, according to embodiments as disclosed herein.

Embodiments herein enable the multimedia analysis engine 110 to use the matrix of machine learned contextual data models for establishing the context of the multimedia. The matrix of machine learned contextual data models can be pre-trained or pre-existing or publicly available models, that can be configured to develop an intelligent data from the extracted content of the multimedia.

As illustrated in FIG. 6, establishing the context for the multimedia involves building the matrix of machine learned contextual data models and generating necessary inputs for a sequence of steps to generate new data that can be subsequently used to build the context of the multimedia. The multimedia analysis engine 110 can build the matrix of machine learned contextual models using inputs such as, but not limited to, uniquely tagged audio, video and metadata content extracted from the online multimedia using the data extraction, customer submitted domain specific multimedia content, separately built machine learnt multi-domain data corpus and so on. The multi-domain data corpus represents different fields of the content of the multimedia categorized into different domains. The domain categorization helps to impose relevant classification of context to the selected multimedia. The matrix of the machine learned contextual models represents an arrangement of different types of machine learnt data models carrying the context of the multimedia, which can be used by different methods in their independent capacities to produce outputs in a form of new data. This form of data captures the relevant context of the multimedia and can be used to develop content/data elements, which can be used by the user to validate the consumption intent. The machine learnt data models of the matrix of the machine learned contextual models can be, but is not limited to, a speech acoustic model, a domain language model, lexicon and so on.

The multimedia analysis engine 110 can feed the audio portions into a speech to text decoder that can select at least one machine learnt data model of the matrix of the machine learned contextual models to decode the audio portions of the multimedia into the transcript and the associated textual summary. The multimedia analysis engine 110 can feed the textual summary/transcript into a transcript generator to develop the textual summary into the structured/ordered text using the at least one machine learnt data model of the matrix of the machine learned contextual models. The structured text represents a clean, punctuated data, which is paraphrased using the at least one machine learnt data model (for example: a domain centric data model). The multimedia analysis engine 110 further uses the at least one machine learnt data model to identify the new contextual titles and subtitles from the structured text, which can be developed into the index table for the contents of the multimedia. The multimedia analysis engine 110 further can feed the structured text into a keyword generator, which uses the at least one machine learned contextual model of the matrix of the machine learned contextual models and identifies the keywords that represent the context of the multimedia. The keywords can be used further by several other methods as a technique to preserve the multimedia context and generate new data elements, which helps to extend the context beyond the title of the multimedia.

The multimedia analysis engine 110 further feeds the video portions to a video frame decoder that applies a video frame analysis on the video portions/visual content of the multimedia for analyzing the video portions/image frames using at least one of object detection and recognition, action detection and recognition, optical character recognition (for graphical text), CV techniques and so on. The multimedia analysis engine 110 further uses the at least one machine learned contextual model of the matrix of the machine learned contextual models (both pre-trained and newly trained contextual/domain-specific models) for translating the analyzed video portions into a textual list of detected and recognized elements (the keywords), that represent the context of the multimedia.

Figure 7:
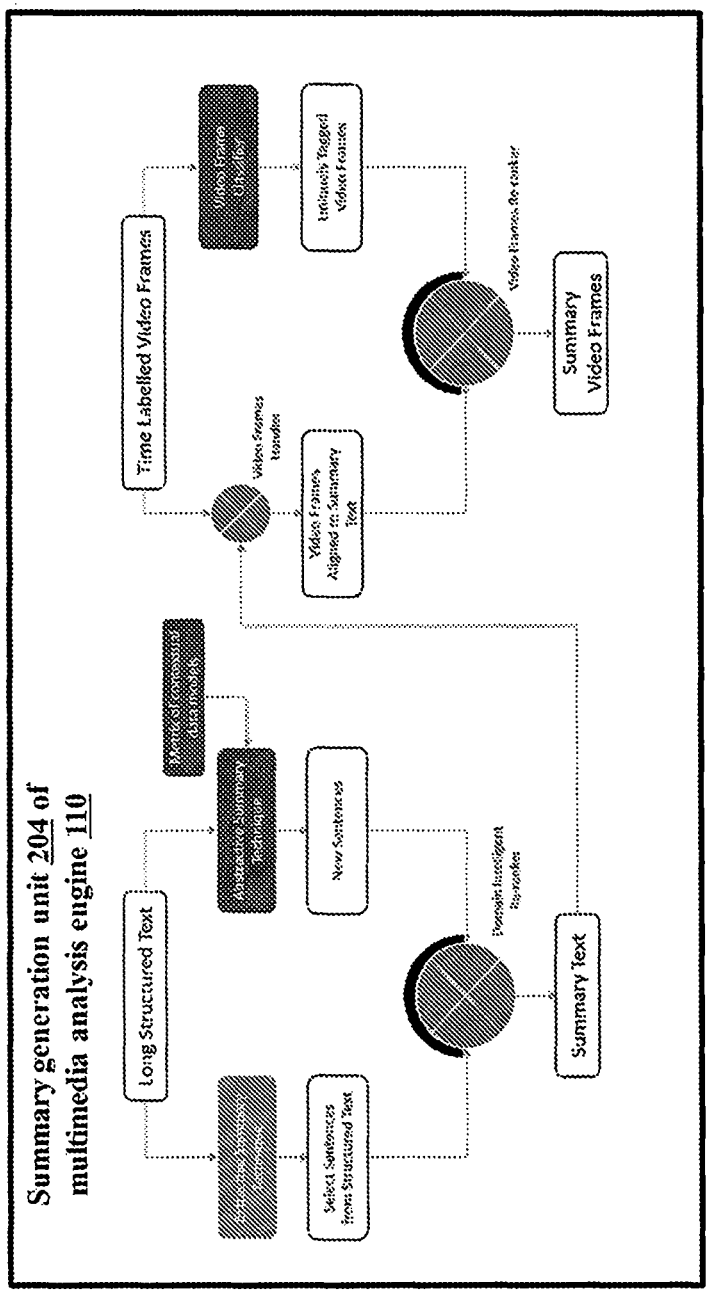
FIG. 7 is an example diagram illustrating generation of summary for the content of the multimedia, according to embodiments as disclosed herein.

FIG. 7 is an example diagram illustrating generation of the summary for the content of the multimedia, according to embodiments as disclosed herein.

The multimedia analysis engine 110 uses long structured text and the video portions/frames of the multimedia as the inputs and generates information in a more condensed form, which provides a gist/summary of the content of the multimedia to the user. The summary can be presented in at least one of a standalone text (the text summary) and video imaged forms (the video summary). The multimedia analysis engine 110 further uses the extractive and/or abstractive techniques to process the structured text for building the text summary (the standalone text). The extractive techniques use the text phrases from the original text of the multimedia and the abstractive techniques use the at least one machine learned contextual model of the matrix of the machine learned contextual models to generate new sentences. The multimedia analysis engine 110 assigns scores for the sentences/text phrases. Based on the scores/ranks, the multimedia analysis engine 110 selects the sentences and represents as the text summary (obtained from the structured text). Further, the multimedia analysis engine 110 can feed the text summary into a video frames handler that aligns the video frames with the text summary. The multimedia analysis engine 110 can further feed the aligned video frames with the text summary to a video frames re-ranker that generates the video summary of the video frames aligned and progressing along with the associated text summary based on the aligned video frames and other video frames, which are classified and tagged using domain intelligence.

Figure 8:
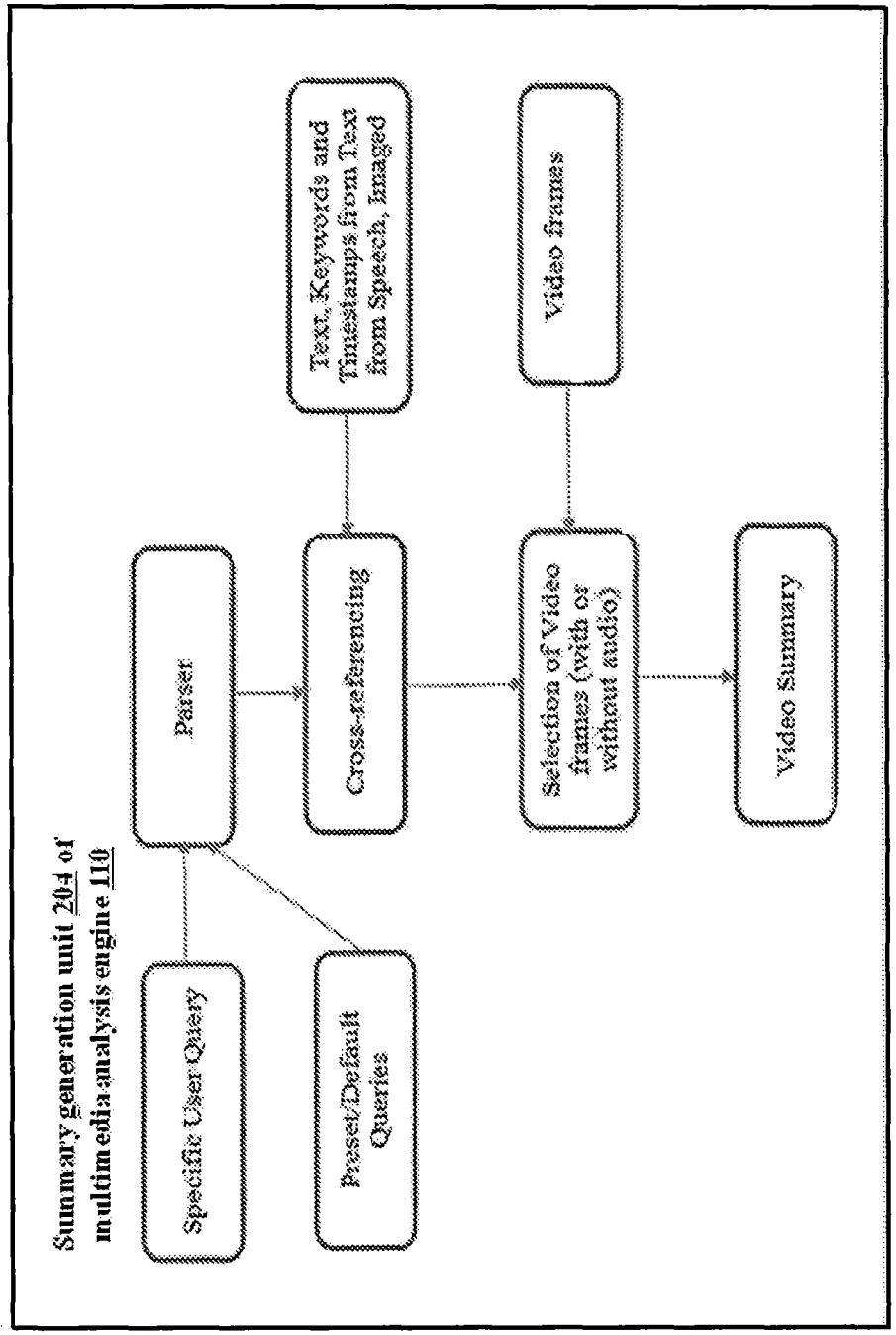
FIG. 8 is an example diagram illustrating a method for generating video/visual summary for the content of the multimedia, according to embodiments as disclosed herein.

FIG. 8 is an example diagram illustrating a method for generating the video/visual summary for the multimedia, according to embodiments as disclosed herein.

Embodiments herein enable the multimedia analysis engine 110 to generate the video summary (except in the case of the audio-only content), which can be entirely composed of the video frames rather than aligned with the text. The video summary can be composed using multiple sources of gleaned data (not just the text summary) and the information extracted from the multimedia to present the summary of the relevant frames of the video with or without accompanying the audio. The video summary can be generated in response to a specific query or from preset queries one of which could be based on importance of certain keywords or objects and actions. The video summary can also provide a quick overview and a "trailer" of sorts for the user to absorb and quickly decide to move on and watch the entire video/multimedia.

Figure 9:
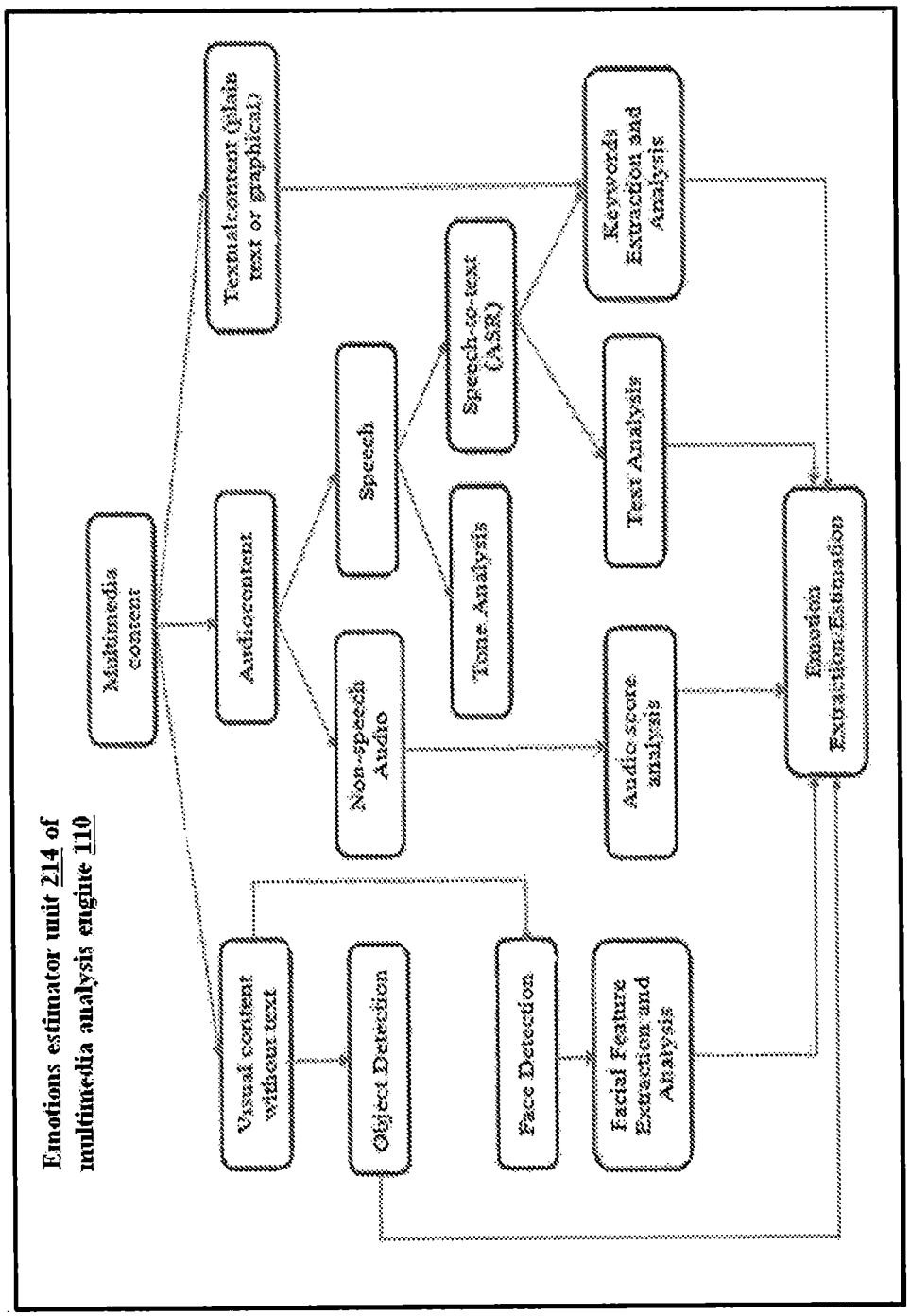
FIG. 9 is an example diagram illustrating generation of emotions and related analytics and insights, according to embodiments as disclosed herein.

FIG. 9 is an example diagram illustrating generation of the emotions and the related analytics and insights, according to embodiments as disclosed herein.

Embodiments herein enable the multimedia analysis engine 110 to evaluate, extract, detect and estimate the emotions present in the contents of the multimedia and accordingly generate the insights into the estimated emotions for the purpose of understanding the content of the multimedia. The multimedia analysis engine 110 can evaluate, extract, detect and estimate the emotions based on at least one of an object detection technique, a face detection method, a facial feature extraction and analysis method, a speech recognition and text analysis method, a keyword/keyphrase analysis method, a speech tone analysis method, a background audio score analysis method and so on. For example, the user may use the estimated emotions to understand the emotion of a person when talking about a product, or when in a conversation or interaction with another person or object, or when addressing topics and matters in a discussion or oration, or in reaction to events/actions/objects/persons.

Figure 10:
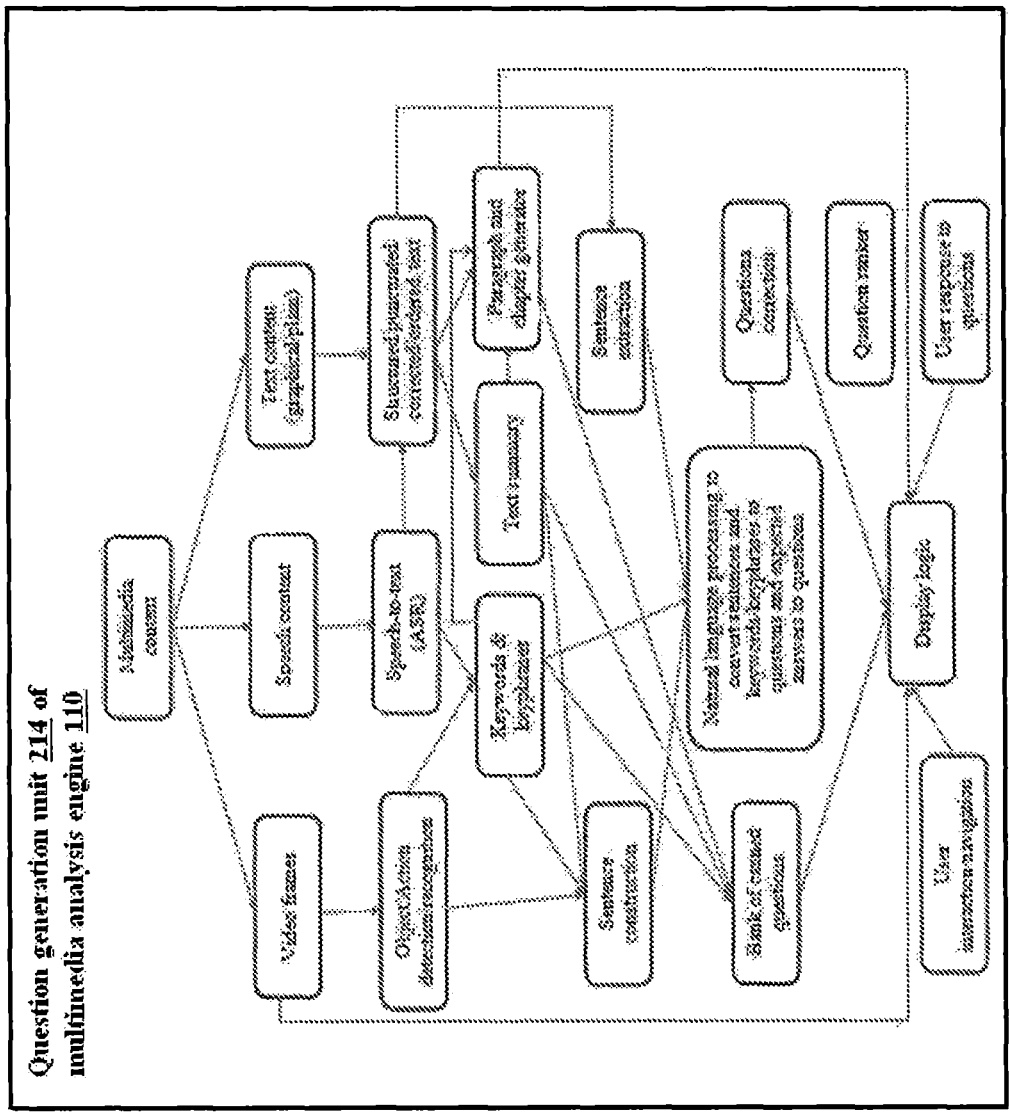
FIG. 10 is an example diagram illustrating generation of questions based on the content of the multimedia, according to embodiments as disclosed herein.

FIG. 10 is an example diagram illustrating generation of the questions based on the content of the multimedia, according to embodiments as disclosed herein.

Embodiments herein enable the multimedia analysis engine 110 to generate the questions based on the content of the multimedia by individually analyzing at least one of the video portions, the audio portions and the text portions present in the multimedia and the text summary. The text portions can include the structured, punctuated, corrected and ordered text extracted from at least one of the speech/audio portions and other text content. The text summary can be generated from the structured, punctuated, corrected and ordered text along with the paragraphs and the chapters. The multimedia analysis engine 110 generates the keywords and/or keyphrases from at least one of the text, the text summary and the objects and/or objects recognized from the video portions of the multimedia. The multimedia analysis engine 110 constructs the sentences using the generated keywords and/or keyphrases, the text summary and sentences extracted from the structured text. Further, the multimedia analysis engine 110 applies the NLP technique on the constructed sentences to generate the questions belonging to the at least one category (the objective, the factual, the subjective, the reflective and so on) and as well as the answers for the generated questions. The multimedia analysis engine 110 further uses the NLP technique to assign rank for the questions. The multimedia analysis engine 110 selects the questions from the preset/canned question bank based on the keywords and keyphrases and parsed text summary and paragraphs and chapters. The multimedia analysis engine 110 further instructs the display 106 to display the questions to the user based on at least one of the rank of questions, timestamps of the video frames, the timestamps of text transcript or sentences, the timestamps of the keywords and keyphrases, the paragraphs and chapters, the user navigation/playback/interaction, the user responses/answers to the questions. The multimedia analysis engine 110 can also instruct the display 106 to display the questions to the user at the end of chapters or end of content of the multimedia.

Figure 11:
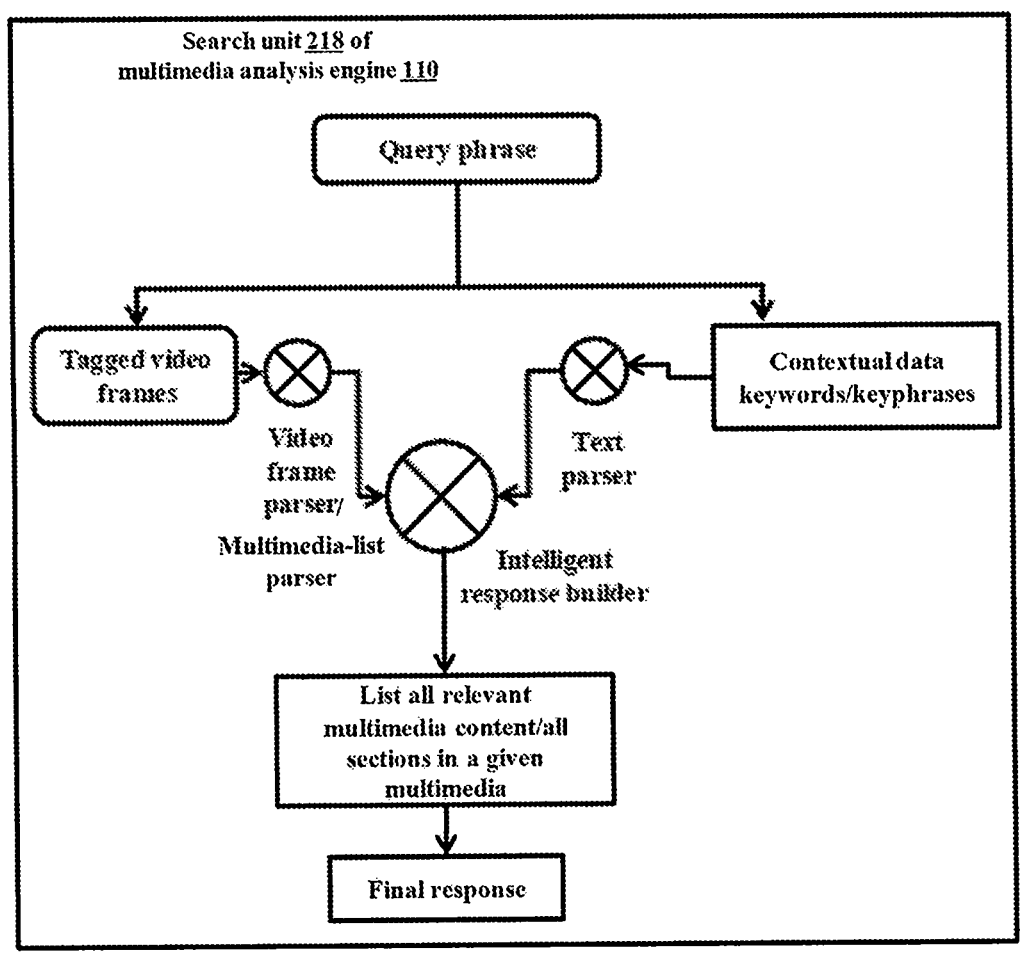
FIG. 11 is an example diagram illustrating a mechanism to perform a search inside the multimedia, according to embodiments disclosed herein.

FIG. 11 is an example diagram illustrating a mechanism to perform the search inside the multimedia, according to embodiments disclosed herein.

Embodiments herein enable the user to find relevant sections inside the multimedia. The display 106 of the electronic device 100 can be configured to receive a query (at least one of word, phrase and so on) from the user as the input/user search intent (at least one of a textual input, a video/image input and so on). The display 106 provides the received input to the multimedia analysis engine 110 that feeds the input into at least one of a video-frame parser, a multimedia-list parser and a text parser. The video-frame parser determines relevant frames from the video portions of the multimedia using the at least one contextual data element. The multimedia-list parser determines the relevant content of the multimedia from a set of multimedia content (or sets of multimedia contents) which has the contextual data elements that match with the description of the query/input. The text parser determines relevant sections inside the multimedia or across the set of multimedia based on the textual summary/transcript obtained from at least one of the audio portions using the ASR, the graphical text in the video portions using the OCR and so on. The multimedia analysis engine 110 feeds outputs received from the video-frame parser, the multimedia-list parser and the text parser into an intelligent response builder. The intelligent response builder can be configured to use domain intelligence as one of criterion to rank the video frames or contents from the lists in set of the multimedia and the text for identifying the relevant sections of the given multimedia or across the set/sets of multimedia content. The multimedia analysis engine 110 further provides the identified relevant sections of the multimedia or relevant subset as a final response to the query received from the user.

Figure 12A:
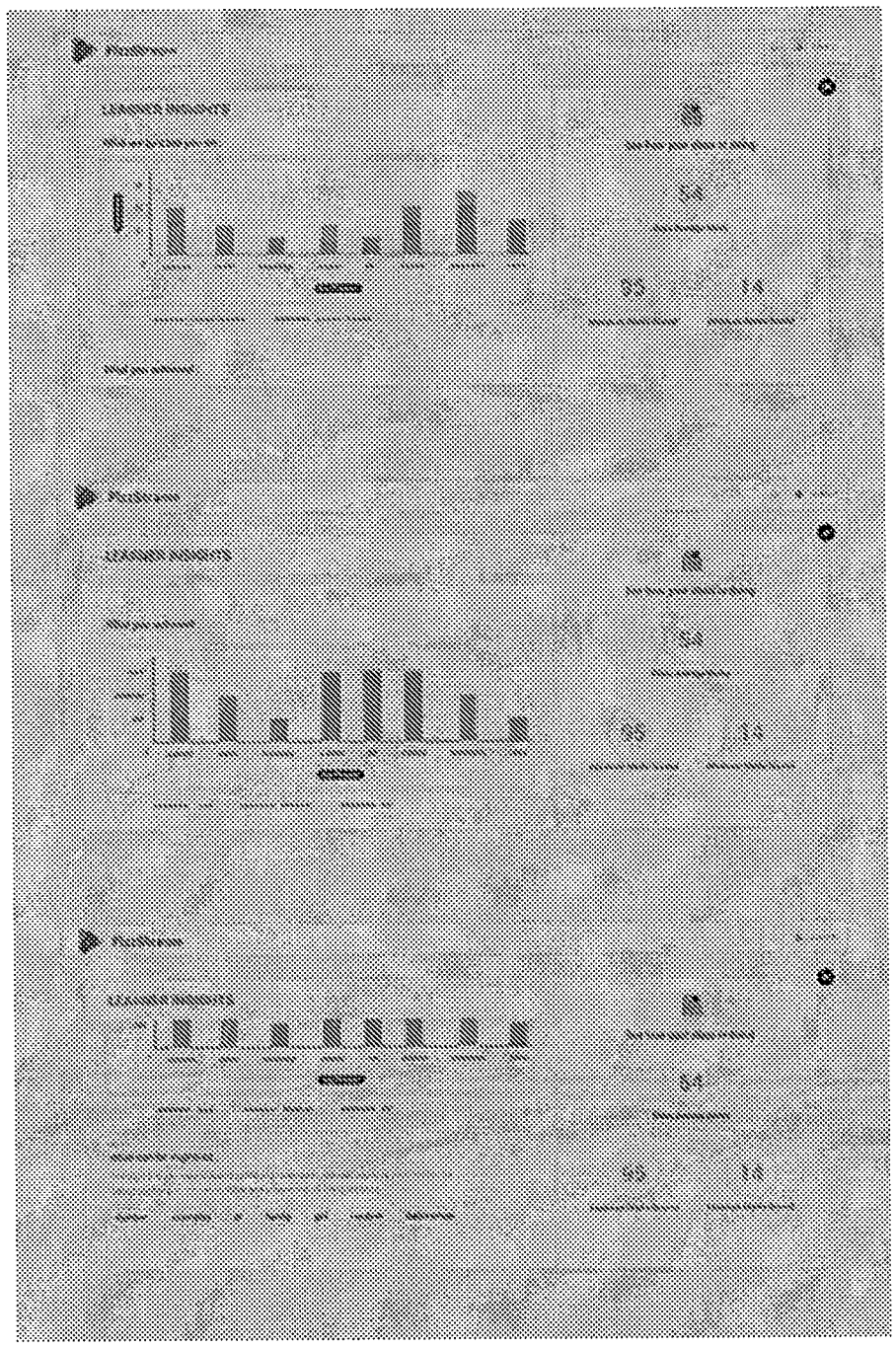
FIGS. 12a and 12b depict example graphs referring to the analytics and the insights generated for the content of the multimedia, according to embodiments as disclosed herein.
Figure 12B:
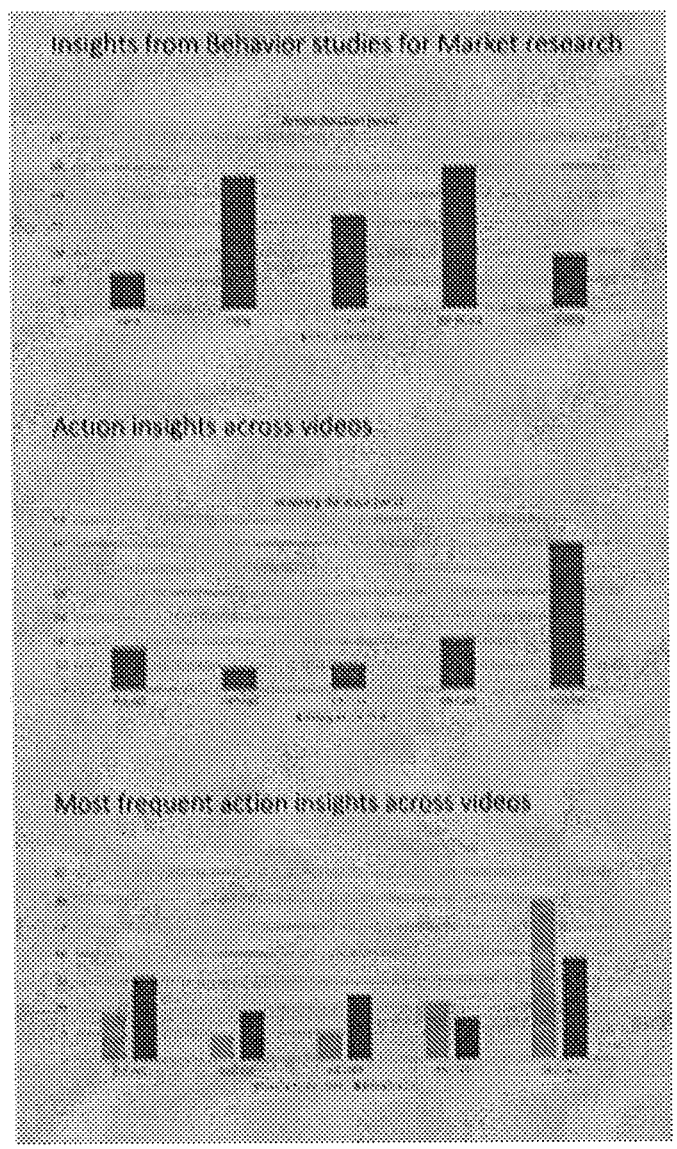

FIGS. 12*a* and 12*b* depict example graphs referring to the analytics and the insights generated for the content of the multimedia, according to embodiments as disclosed herein.

In an example as illustrated in FIG. 12*a*, the multimedia analysis engine 110 generates the insights based on the analytics that include information about the occurrences of the keyphrases in the questions generated and displayed to the user (the entire class/group on the same course in the same LMS) and performance of the user (the answers given by the user in response to displayed questions) on the questions relevant to the keyphrases. The insights suggest the users that in which subject the performance need to be improved. In an example herein, analytics generated based on the performance of the user (in the form of graphs) and the insights generated based on the generated analytics are illustrated in FIG. 12a.

In an example as illustrated in FIG. 12b, the multimedia analysis engine 110 generates the insights based on the analytics that include information about the market and product research survey such as, but not limited to, a computed duration of detected/recognized actions performed in a product survey video, how such actions can be varied across the different surveys (different videos), which actions are performed most often and so on. The insights generated herein can provide ample understanding to the user/surveyor about a usage of the products. In an example herein, analytics generated for the market and product research survey (in the form of graphs) and the insights generated based on the generated analytics are illustrated in FIG. 12b.

Embodiments herein provide a mechanism to summarize the multimedia, wherein the multimedia can include at least one of but not limited to text, audio or video. The generated multimedia summarization enables the user to identify and categories the multimedia into different categories for example, mass media (for example, news or the like), sports content, film content, print matter, educational videos or the like.

Embodiments herein also provide video thumbnails or "trailers" and provide a mechanism to perform a concept-based search (like keyword search). Embodiments herein also generate multimedia consumption patterns and associated analyses for internal communication. Embodiments herein help in corporate trainings for absorbing training material and passing assessments.

Embodiments herein facilitate searching within and across all multimedia, generate relationships and links between different categories—cross-search using keywords and keyphrases. Embodiments herein also help in collation and consolidation of material for easy consumption.

Embodiments herein help in law enforcement by generating a surveillance summary. Further, embodiments herein aggregate data using search terms and relationships.

Embodiments herein generate insights from all the data obtained from multiple sources and associated analyses as required by the consumers of such information to formulate their product strategies for design, development, advertisement, training and surveys.

Embodiments herein generate an emotion map of the entire given multimedia as well as categorize the multimedia under broad classification of emotions present in the multimedia, assisting in locating portions of the multimedia belonging to certain emotions or to locate media with a specific overall emotion. Thus, drawing inferences and conclusions about reactions and opinions of persons present in the multimedia.

The embodiments disclosed herein can be implemented through at least one software program running on at least one hardware device and performing network management functions to control the elements. The elements shown in FIG. 1-FIG. 11 can be at least one of a hardware device, or a combination of hardware device and software module.

The embodiments disclosed herein describe methods and systems for generating contextual data elements of the multimedia for identifying consumption intent of a user. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high-speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for identifying a consumption intent of a user, the method comprising:

extracting, by a content extraction module, content of at least one multimedia, wherein the content is represented in a form of at least one of at least one video portion and at least one audio portion in the at least one multimedia;

generating, by a multimedia analysis engine, at least one contextual data element for the extracted content of the at least one multimedia, wherein the at least one contextual data element includes at least one of at least one summary, at least one keyword, at least one keyphrase, at least one paragraph, at least one chapter, at least one index table, at least one question, analytics, emotions and insights, wherein generating the at least one contextual data element includes:

generating at least one of the at least one keyword and the at least one keyphrase from at least one of the at least one video portion and the at least one audio portion of the multimedia using at least one of an Automatic Speech Recognition (ASR) method, an Optical Character Recognition (OCR) method and Computer Vision (CV) techniques, wherein at least one of the at least one keyword and the at least one keyphrase represent context of the content of the multimedia;

generating the at least one summary for the content of the at least one multimedia by analyzing the at least one video portion and the at least one audio portion of the multimedia, wherein the at least one summary includes at least one of a text summary and a visual summary;

generating at least one paragraph and at least one chapter based on at least one of the at least one keyword and the at least one keyphrase appeared in a timestamp associated with the at least one summary;

generating at least one index table for the generated at least one chapter using the content of the multimedia that is synced with occurrence of the content on a time scale of the multimedia;

generating the at least one question for the content of the multimedia based on generated at least one of the at least one keyword and the at least one keyphrase for the content of the at least one multimedia;

generating the analytics for the content of the multimedia based on at least one of the generated at least one of the at least one keyword and the at least one keyphrase, the generated at least one question and at least one answer received from the user in response to the generated at least one question;

generating the emotions based on at least one of an object detection technique, a face detection method, a facial feature extraction and analysis method, a speech recognition and text analysis method, a keyword/keyphrase analysis method, a speech tone analysis method and a background audio score analysis method;

generating the insights based on at least one of the generated analytics and the estimated emotions for the content of the at least one multimedia; and displaying, by a display, the at least one contextual data element to the user when consuming the at least one multimedia by satisfying the consumption intent of the user.

2. The method of claim 1, further comprises receiving, by the multimedia analysis engine, an input from the user on the displayed at least one contextual data element to play the at least one multimedia associated with the at least contextual data element and play an interested content of the at least one multimedia.

3. The method of claim 1, further comprises: receiving, by the multimedia analysis engine, a user search intent from the user to identify the content of the at least one multimedia matching with the user search intent based on the at least one contextual data element generated for the content of the at least one multimedia.

4. The method of claim 3, wherein identifying the content of the at least one multimedia matching with the user search intent includes:

determining at least one video frame from the at least one video portion of the multimedia, at least one relevant content of the at least one multimedia and relevant sections of the at least one relevant content of the at least multimedia that are matching with the user search intent using the generated at least one contextual data element;

ranking determined at least one of the at least one video frame, the at least one relevant content and the at least one sections of the at least one relevant content; and providing at least one of the determined at least one video frame the at least one relevant content and the at least one sections of the at least one relevant content as a search result to the user based on the ranking.

5. The method of claim 1, wherein extracting the content of the at least one multimedia includes:

obtaining and converting, the content of the at least one multimedia into at least one appropriate format, wherein the at least one appropriate format includes at least one of a bandwidth format, a bit rate format and a channel format;

filtering at least one irrelevant portion of the content when the content of the at least one multimedia is converted into the at least one appropriate format; and classifying the content into at least one category based on filtering of the at least one irrelevant portion of the content.

6. The method of claim 1, wherein generating the at least one summary includes:

extracting the audio portions of the at least one multimedia to generate transcript;

generating structured text by processing the transcript using at least one machine learnt model of a matrix of machine learned contextual data models;

processing the structured text using at least one of an extractive technique and an abstractive technique to generate the text summary; and aligning at least one video frame of the video portions of the at least one multimedia to generate the visual summary.

7. The method of claim 1, wherein generating the at least one paragraph and the at least one chapter includes:

analyzing the at least one of the at least one keyword and the at least one keyphrase appeared in the timestamp associated with the at least one summary using at least one of a Natural Language Processing (NLP) method and the at least one machine learnt model of the matrix of machine learned contextual data models to generate the at least one paragraph;

analyzing at least one of at least one sentence of the at least one paragraph and the at least one paragraph using the at least one machine learnt model of the matrix of machine learned contextual data models to determine subject associated with the at least one of the at least one sentence of the at least one paragraph and the at least one paragraph; and generating the at least one chapter based on the determined subject associated with the at least one of the at least one sentence of the at least one paragraph and the at least one paragraph.

8. The method of claim 1, wherein generating the at least one index table includes:

generating at least one of at least one contextual title and at least one subtitle from the structured text using the at least one machine learnt model of a matrix of machine learned contextual data models; and generating the at least one index table based on the at least one of the at least one contextual title and at least one subtitle.

9. The method of claim 1, wherein generating the analytics includes:

analyzing at least one of the at least one keyword and the at least one keyphrase, timestamps of occurrences of at least one of the at least one keyword and the at least one keyphrase, at least one of objects and actions recognized in the at least one video portion of the multimedia, a frequency of occurrences of at least one of the at least one keyword, the at least one keyphrase, the objects and the actions, the at least one question and the at least one answer provided by the user in response to the displayed at least one question to generate the analytics.

10. The method of claim 1, wherein estimating the emotions includes:

analyzing the at least one audio portion of the multimedia to estimate audio input data and associated emotions by:
  extracting at least one speech portion and non-speech portion from the at least one audio portion of the multimedia;
  analyzing the at least one speech portion using at least one of the speech tone analysis method and the speech recognition and text analysis method;
  analyzing the at least one non-speech portion using the audio score analysis method; and
  estimating the audio input and the associated emotions based on the analysis of the at least one speech portion and the at least one non-speech portion;
analyzing the at least one video portion of the multimedia using at least one of the face detection method and the facial feature extraction and analysis method to estimate video input data and associated emotions; and
combining the audio input data and the associated emotions and the video input data and the associated emotions using the at least one machine learnt model of the matrix of machine learned contextual data models to generate the emotions for the at least one multimedia and classify the emotions into at least one type.

11. The method of claim 1, wherein generating the insights includes:
  performing analysis on at least one of the generated analytics by creating analytics summaries, answers generated to at least one query of interest about the content of the at least one multimedia, actions and events present in the content of the multimedia and reactions and interactions present in the content of the at least one multimedia using text and graph parsing and interpreting and sentence-constructing method;
  interpreting the emotions estimated for the content of the at least one multimedia; and
  generating the insights for the content of the at least one multimedia based on at least one of the analysis performed using the text and graph parsing and interpreting and sentence-constructing method and the interpreted emotions.

12. The method of claim 11, wherein the insights indicate at least one of textual phrasing of the analytics, an overall emotion, a pre-dominant emotion, a certain probability of an emotion following another particular emotion, a certain probability of a resulting action based on a mixture of the emotions and a probability of genre of the at least one multimedia based on the mixture of the emotions.

13. An electronic device comprising:
  a content extraction module configured for extracting content of at least one multimedia, wherein the content is represented in a form of at least one of at least one video portion and at least one audio portion in the at least one multimedia;
  a multimedia analysis engine configured for generating at least one contextual data element for the extracted content of the at least one multimedia, wherein the at least one contextual data element includes at least one of at least one summary, at least one keyword, at least one keyphrase, at least one paragraph, at least one chapter, at least one index table, at least one question, analytics, emotions and insights, wherein the multimedia analysis engine comprises:
  a keyword/keyphrase generation unit configured for generating at least one of the at least one keyword and the at least one keyphrase from at least one of the at least one video portion and the at least one audio portion of the multimedia using at least one of an Automatic Speech Recognition (ASR), an Optical Character Recognition (OCR) method and Computer Vision (CV) techniques, wherein at least one of the at least one keyword and the at least one keyphrase represent context of the content of the multimedia;
  a summary generation unit configured for generating the at least one summary for the content of the at least one multimedia by analyzing the at least one video portion and the at least one audio portion of the multimedia, wherein the at least one summary includes at least one of a text summary and a visual summary;
  a paragraph and chapter generation unit configured for generating at least one paragraph and at least one chapter based on at least one of the at least one keyword and the at least one keyphrase appeared in a time stamp associated with the at least one summary;
  an index table generation unit configured for generating at least one index table for the generated at least one chapter using the content of the multimedia that is synced with occurrence of the content on a time scale of the multimedia;
  a question generation unit configured for generating the at least one question for the content of the multimedia based on generated at least one of the at least one keyword and the at least one keyphrase for the content of the at least one multimedia;
  an analytics generation unit configured for generating the analytics for the content of the multimedia based on at least one of the generated at least one of the at least one keyword and the at least one keyphrase, the generated at least one question and at least one answer received from the user in response to the generated at least one question;
  an emotion estimation unit configured for estimating the emotions based on at least one of an object detection technique, a face detection method, a facial feature extraction and analysis method, a speech recognition and text analysis method, a keyword/keyphrase analysis method, a speech tone analysis method and a background audio score analysis method; and
  an insight generation unit configured for generating the insights based on at least one of the generated analytics and the estimated emotions for the content of the at least one multimedia; and
  a display configured for displaying the at least one contextual data element to the user when consuming the at least one multimedia by satisfying the consumption intent of the user.

14. The electronic device of claim 13, wherein the multimedia analysis engine is further configured for receiving an input from the user on the displayed at least one contextual data element to play the at least one multimedia associated with the at least contextual data element and play an interested content of the at least one multimedia.

15. The electronic device of claim 13, wherein the multimedia analysis engine is further configured for receiving a user search intent from the user to identify the content of the at least one multimedia matching with the user search intent based on the at least one contextual data element generated for the content of the at least one multimedia.

16. The electronic device of claim 15, wherein the multimedia analysis engine further comprises a search unit configured for:
  determining at least one video frame from the at least one video portion of the multimedia, at least one relevant content of the at least one multimedia and relevant sections of the at least one relevant content of the at least multimedia that are matching with the user search intent using the generated at least one contextual data element;

ranking determined at least one of the at least one video frame, the at least one relevant content and the at least one sections of the at least one relevant content; and providing at least one of the determined at least one video frame the at least one relevant content and the at least one sections of the at least one relevant content as a search result to the user based on the ranking.

17. The electronic device of claim 13, wherein the content extraction module is further configured for:

obtaining and converting, the content of the at least one multimedia into at least one appropriate format, wherein the at least one appropriate format includes at least one of a bandwidth format, a bit rate format and a channel format;

filtering at least one irrelevant portion of the content when the content of the at least one multimedia is converted into the at least one appropriate format; and classifying the content into at least one category based on filtering of the at least one irrelevant portion of the content.

18. The electronic device of claim 13, wherein the summary generation unit is further configured for:

extracting the audio portions of the at least one multimedia to generate textual summary;

generating structured text by processing the textual summary using at least one machine learnt model of a matrix of machine learned contextual data models;

processing the structured text using at least one of an extractive technique and an abstractive technique to generate the text summary; and aligning at least one video frame of the video portions of the at least one multimedia to generate the visual summary.

19. The electronic device of claim 13, wherein the paragraph and chapter generation unit is further configured for:

analyzing the at least one of the at least one keyword and the at least one keyphrase appeared in the time stamp associated with the at least one summary using at least one of a Natural Language Processing (NLP) method and the at least one machine learnt model of the matrix of machine learned contextual data models to generate the at least one paragraph;

analyzing at least one of at least one sentence of the at least one paragraph and the at least one paragraph using the at least one machine learnt model of the matrix of machine learned contextual data models to determine subject associated with the at least one of the at least one sentence of the at least one paragraph and the at least one paragraph; and generating the at least one chapter based on the determined subject associated with the at least one of the at least one sentence of the at least one paragraph and the at least one paragraph.

20. The electronic device of claim 13, wherein the index table generation unit is further configured for;

generating at least one of at least one contextual title and at least one subtitle from the structured text using the at least one machine learnt model of a matrix of machine learned contextual data models; and generating the at least one index table based on the at least one of the at least one contextual title and at least one subtitle.

21. The electronic device of claim 13, wherein the analytics generation unit is further configured for:

analyzing at least one of the at least one keyword and the at least one keyphrase, timestamps of occurrences of at least one of the at least one keyword and the at least one keyphrase, at least one of objects and actions recognized in the at least one video portion of the multimedia, a frequency of occurrences of at least one of the at least one keyword, the at least one keyphrase, the objects and the actions, the at least one question and the at least one answer provided by the user in response to the displayed at least one question to generate the analytics.

22. The electronic device of claim 13, wherein the emotion estimation unit is further configured for:

analyzing the at least one audio portion of the multimedia to estimate audio input data and associated emotions by:

extracting at least one speech portion and non-speech portion from the at least one audio portion of the multimedia;

analyzing the at least one speech portion using at least one of the speech tone analysis method and the speech recognition and text analysis method;

analyzing the at least one non-speech portion using the audio score analysis method; and estimating the audio input and the associated emotions based on the analysis of the at least one speech portion and the at least one non-speech portion;

analyzing the at least one video portion of the multimedia using at least one of the face detection method and the facial feature extraction and analysis method to estimate video input data and associated emotions; and combining the audio input data and the associated emotions and the video input data and the associated emotions using the at least one machine learnt model of the matrix of machine learned contextual data models to generate the emotions for the at least one multimedia and classify the emotions into at least one type.

23. The electronic device of claim 13, wherein the insight generation unit is further configured for:

performing analysis on at least one of the generated analytics by creating analytics summaries, answers generated to at least one query of interest about the content of the at least one multimedia, actions and events present in the content of the multimedia and reactions and interactions present in the content of the at least one multimedia using text and graph parsing and interpreting and sentence-constructing method;

interpreting the emotions estimated for the content of the at least one multimedia; and generating the insights for the content of the at least one multimedia based on at least one of the analysis performed using the text and graph parsing and interpreting and sentence-constructing method and the interpreted emotions.

24. The electronic device of claim 23, wherein the insights indicate at least one of textual phrasing of the analytics, an overall emotion, a pre-dominant emotion, a certain probability of an emotion following another particular emotion, a certain probability of a resulting action based on a mixture of the emotions and a probability of genre of the at least one multimedia based on the mixture of the emotions.

* * * * *